United States Patent
Kimura et al.

(10) Patent No.: US 12,553,370 B2
(45) Date of Patent: Feb. 17, 2026

(54) HYDROCARBON DEPOSITION AMOUNT ESTIMATION DEVICE, HYDROCARBON DEPOSITION AMOUNT ESTIMATION METHOD, CONTROL DEVICE, AND EXHAUST GAS PURIFICATION SYSTEM

(71) Applicant: Komatsu Ltd., Tokyo (JP)

(72) Inventors: Mitsuyoshi Kimura, Tokyo (JP); Yutaka Ono, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/035,967

(22) PCT Filed: Feb. 22, 2022

(86) PCT No.: PCT/JP2022/007395
§ 371 (c)(1),
(2) Date: May 9, 2023

(87) PCT Pub. No.: WO2022/181641
PCT Pub. Date: Sep. 1, 2022

(65) Prior Publication Data
US 2023/0417165 A1      Dec. 28, 2023

(30) Foreign Application Priority Data

Feb. 26, 2021   (JP) ................................ 2021-030520

(51) Int. Cl.
*F01N 3/24*     (2006.01)
*B01D 53/94*    (2006.01)
(Continued)

(52) U.S. Cl.
CPC ............... *F01N 3/24* (2013.01); *B01D 53/94* (2013.01); *B01D 53/96* (2013.01); *F01N 3/20* (2013.01); *F01N 2560/06* (2013.01)

(58) Field of Classification Search
CPC ......... F01N 2560/06; F01N 2900/1602; F01N 11/00; F01N 11/002; F01N 13/009;
(Continued)

(56) References Cited

U.S. PATENT DOCUMENTS 6,354,076 B1 *   3/2002   Yasui ..................... F01N 3/101
                                                              60/297
2015/0240694 A1    8/2015   Aimar et al.
(Continued)

FOREIGN PATENT DOCUMENTS

| CN | 105612320 A | 5/2016 |
|---|---|---|
| JP | 2000-087733 A | 3/2000 |

(Continued)

*Primary Examiner* — Anthony Ayala Delgado
(74) *Attorney, Agent, or Firm* — Troutman Pepper Locke LLP

(57) ABSTRACT

This hydrocarbon deposition amount estimation device comprises a hydrocarbon deposition amount estimation unit that estimates the deposition amount of hydrocarbons deposited in an exhaust gas purification device of an internal combustion engine equipped with an oxidation catalyst on the basis of at least a first measured value corresponding to the intake air temperature of the internal combustion engine, a second measured value corresponding to the temperature of a cooling liquid of the internal combustion engine, and a third measured value corresponding to the exhaust gas flow rate of the internal combustion engine.

6 Claims, 17 Drawing Sheets

(51) Int. Cl.
*B01D 53/96* (2006.01)
*F01N 3/20* (2006.01)

(58) Field of Classification Search
CPC ............ F01N 13/0093; F01N 13/0097; F01N 2250/02; F01N 2430/00; F01N 2430/06; F01N 2550/03; F01N 2560/08; F01N 2560/14; F01N 2900/0418; F01N 2900/0422; F01N 2900/0601; F01N 2900/1402; F01N 2900/1404; F01N 2900/1406; F01N 2900/1618; F01N 2900/1631; F01N 3/0253; F01N 3/035; F01N 3/0835; F01N 3/0878; F01N 3/101; F01N 3/20; F01N 3/2013; F01N 9/00
See application file for complete search history.

(56) References Cited

U.S. PATENT DOCUMENTS

| | | |
|---|---|---|
| 2016/0237930 A1 | 8/2016 | Uchiyama et al. |
| 2017/0159549 A1 | 6/2017 | Uehara et al. |
| 2018/0087466 A1 | 3/2018 | Bromberg et al. |
| 2019/0170080 A1 | 6/2019 | Yokoi |
| 2020/0240354 A1 | 7/2020 | Shirahashi et al. |

FOREIGN PATENT DOCUMENTS

| | | | |
|---|---|---|---|
| JP | 2010019231 A | * | 1/2010 |
| JP | 2013-024210 A | | 2/2013 |
| JP | 2018-084202 A | | 5/2018 |
| JP | 6650675 B2 | | 2/2020 |
| JP | 2020-122410 A | | 8/2020 |
| WO | 2015/177898 A1 | | 11/2015 |

* cited by examiner

FIG. 4

NORMAL CONTROL HC INCREASE AMOUNT ESTIMATION MAP

| | HC INCREASE AMOUNT (DURING NORMAL CONTROL) [mg/s] | | | | | | |
|---|---|---|---|---|---|---|---|
| DOC TEMPERATURE [°C] 300 | 0.1 | 0.3 | 0.3 | 0.2 | 0.2 | 0.2 | 0.2 |
| 220 | 0.1 | 0.3 | 0.3 | 0.2 | 0.2 | 0.2 | 0.2 |
| 200 | 0.1 | 0.3 | 0.3 | 0.2 | 0.2 | 0.2 | 0.2 |
| 150 | 0.2 | 0.6 | 0.6 | 0.4 | 0.4 | 0.4 | 0.4 |
| 100 | 0.4 | 1.2 | 1.2 | 0.8 | 0.8 | 0.8 | 0.8 |
| 50 | 0.8 | 2.4 | 2.4 | 1.6 | 1.6 | 1.6 | 1.6 |
| | 500 | 900 | 1300 | 1700 | 2100 | 2500 | 2900 |
| | ENGINE ROTATION SPEED [rpm] | | | | | | |

LOW TEMPERATURE CONTROL HC INCREASE AMOUNT ESTIMATION MAP

| | HC INCREASE AMOUNT (DURING LOW TEMPERATURE CONTROL) [mg/s] | | | | | | |
|---|---|---|---|---|---|---|---|
| DOC TEMPERATURE [°C] 300 | 1.0 | 3.0 | 3.0 | 2.0 | 2.0 | 2.0 | 2.0 |
| 220 | 1.0 | 3.0 | 3.0 | 2.0 | 2.0 | 2.0 | 2.0 |
| 200 | 1.0 | 3.0 | 3.0 | 2.0 | 2.0 | 2.0 | 2.0 |
| 150 | 2.0 | 6.0 | 6.0 | 4.0 | 4.0 | 4.0 | 4.0 |
| 100 | 4.0 | 12.0 | 12.0 | 8.0 | 8.0 | 8.0 | 8.0 |
| 50 | 8.0 | 24.0 | 24.0 | 16.0 | 16.0 | 16.0 | 16.0 |
| | 500 | 900 | 1300 | 1700 | 2100 | 2500 | 2900 |
| | ENGINE ROTATION SPEED [rpm] | | | | | | |

HC DECREASE AMOUNT ESTIMATION MAP

| | HC DECREASE AMOUNT [mg/s] | | | | | | |
|---|---|---|---|---|---|---|---|
| DOC TEMPERATURE [°C] 300 | -178 | -237 | -316 | -421 | -562 | -749 | -999 |
| 220 | -36 | -47 | -63 | -84 | -112 | -150 | -200 |
| 200 | 0 | 0 | 0 | 0 | 0 | 0 | 0 |
| 150 | 0 | 0 | 0 | 0 | 0 | 0 | 0 |
| 100 | 0 | 0 | 0 | 0 | 0 | 0 | 0 |
| 50 | 0 | 0 | 0 | 0 | 0 | 0 | 0 |
| | 500 | 900 | 1300 | 1700 | 2100 | 2500 | 2900 |
| | ENGINE ROTATION SPEED [rpm] | | | | | | |

— 214

HC INCREMENT ESTIMATION MAP — 215

| HC INCREMENT [mg/s] | INTAKE MANIFOLD TEMPERATURE [°C] | | | | | | | |
|---|---|---|---|---|---|---|---|---|
| | -40 | -30 | -20 | -10 | 0 | 10 | 20 | 30 |
| ENGINE WATER TEMPERATURE [°C] 0 | 50 | 40 | 30 | 20 | 10 | 5 | 5 | 5 |
| 20 | 40 | 32 | 24 | 16 | 8 | 4 | 4 | 4 |
| 40 | 14 | 12 | 10 | 8 | 6 | 3 | 3 | 3 |
| 60 | 7 | 6 | 5 | 4 | 3 | 2 | 2 | 2 |
| 80 | 1 | 1 | 1 | 1 | 1 | 1 | 1 | 1 |
| 100 | 1 | 1 | 1 | 1 | 1 | 1 | 1 | 1 |
| 120 | 1 | 1 | 1 | 1 | 1 | 1 | 1 | 1 |

CORRECTION GAIN MAP

| ENGINE ROTATION SPEED [rpm] | GAIN |
|---|---|
| 0 | 1 |
| 500 | 1 |
| 1000 | 1.3 |
| 1200 | 1.5 |
| 1400 | 1.4 |
| 1600 | 1.3 |
| 1800 | 1.2 |
| 2000 | 1 |
| 2200 | 1 |
| 2400 | 1 |
| 2600 | 1 |

START
↓
S401 READ INTAKE MANIFOLD TEMPERATURE, ENGINE WATER TEMPERATURE, ENGINE ROTATION SPEED, AND DOC TEMPERATURE
↓
S402 ESTIMATE HC INCREMENT USING HC INCREMENT ESTIMATION MAP AND CORRECTION GAIN MAP
↓
S403 ESTIMATE HC DECREASE AMOUNT USING HC DECREASE AMOUNT ESTIMATION MAP
↓
S404 ESTIMATE HC DEPOSITION AMOUNT
↓
END

HYDROCARBON DEPOSITION AMOUNT ESTIMATION DEVICE, HYDROCARBON DEPOSITION AMOUNT ESTIMATION METHOD, CONTROL DEVICE, AND EXHAUST GAS PURIFICATION SYSTEM

TECHNICAL FIELD

The present invention relates to a hydrocarbon deposition amount estimation device, a hydrocarbon deposition amount estimation method, a control device, and an exhaust gas purification system.

Priority is claimed on Japanese Patent Application No. 2021-030520, filed Feb. 26, 2021, the content of which is incorporated herein by reference.

BACKGROUND ART

Patent Literature 1 describes a system that estimates unburned hydrocarbons (hereinafter referred to as HCs, HC is a generic term for organic compounds containing carbon and hydrogen) accumulated in a device that configures an exhaust gas post-processing system of an internal combustion engine, and accelerates the heating of an exhaust pipeline of the exhaust gas post-processing system when the estimated result exceeds a predetermined threshold value. In the system described in Patent Literature 1, a mass I of HCs accumulated in the exhaust pipeline is calculated by the calculation formula "I=R+P−C." Here, R is the residual value, P is the mass of HCs produced in the internal combustion engine (increase amount or increment in HCs), and C is the mass of HCs converted in the exhaust gas post-processing system (decrease amount or decrement in HCs). In this system, the HC increase amount (P) is calculated using a map created based on experimental data using the internal combustion engine rotation speed (RPM), the injected fuel mass, the intake air mass, and preferably the ambient temperature as parameters. In addition, the HC decrease amount (C) is estimated depending on the temperature of the devices that configure the exhaust gas post-processing system.

CITATION LIST

Patent Literature

[Patent Literature 1]
Japanese Patent No. 6650675

SUMMARY OF INVENTION

Technical Problem

In the system described in Patent Literature 1, the HC increase amount (P) is calculated using a map using the internal combustion engine rotation speed, the injected fuel mass, the intake air mass, and preferably the ambient temperature as parameters. In this case, since the only parameter related to temperature is the ambient temperature, for example, when the ambient temperature is low, there is a problem that the estimation error of the HC increase amount differs depending on whether the internal combustion engine is relatively warm or not. In addition, in general, in the estimation processing, when the number of parameters increases, the estimation accuracy can be expected to improve. However, it may take time and effort to create a calculation method, and appropriate parameter selection is required.

The present invention has been made in view of the above circumstances, and an object thereof is to provide a hydrocarbon deposition amount estimation device, a hydrocarbon deposition amount estimation method, a control device, and an exhaust gas purification system that are capable of estimating a hydrocarbon (HG) deposition amount appropriately and accurately.

Solution to Problem

In order to solve the above problems, according to an aspect of the present invention, there is provided a hydrocarbon deposition amount estimation device including: a hydrocarbon deposition amount estimation unit that estimates a deposition amount of hydrocarbons deposited in an exhaust gas purification device of an internal combustion engine equipped with an oxidation catalyst based on at least a first measured value corresponding to an intake air temperature of the internal combustion engine, a second measured value corresponding to a temperature of a cooling liquid of the internal combustion engine, and a third measured value corresponding to an exhaust gas flow rate of the internal combustion engine.

In addition, according to another aspect of the present invention, there is provided a hydrocarbon deposition amount estimation method including: a step of estimating a deposition amount of hydrocarbons deposited in an exhaust gas purification device of an internal combustion engine equipped with an oxidation catalyst based on at least a first measured value corresponding to an intake air temperature of the internal combustion engine, a second measured value corresponding to a temperature of a cooling liquid of the internal combustion engine, and a third measured value corresponding to an exhaust gas flow rate of the internal combustion engine.

In addition, according to still another aspect of the present invention, there is provided a control device including: a hydrocarbon deposition amount estimation unit that estimates a deposition amount of hydrocarbons deposited in an exhaust gas purification device of an internal combustion engine equipped with an oxidation catalyst based on at least a first measured value corresponding to an intake air temperature of the internal combustion engine, a second measured value corresponding to a temperature of a cooling liquid of the internal combustion engine, and a third measured value corresponding to an exhaust gas flow rate of the internal combustion engine; and a temperature rise control execution unit that executes temperature rise control of exhaust gas of the internal combustion engine.

In addition, according to still another aspect of the present invention, there is provided an exhaust gas purification system including: a control device including a hydrocarbon deposition amount estimation unit that estimates a deposition amount of hydrocarbons deposited in an exhaust gas purification device of an internal combustion engine equipped with an oxidation catalyst based on at least a first measured value corresponding to an intake air temperature of the internal combustion engine, a second measured value corresponding to a temperature of a cooling liquid of the internal combustion engine, and a third measured value corresponding to an exhaust gas flow rate of the internal combustion engine, and a temperature rise control execution unit that executes temperature rise control of exhaust gas of the internal combustion engine; and the exhaust gas purification device.

Advantageous Effects of Invention

According to each aspect of the present invention, the hydrocarbon (HC) deposition amount can be estimated appropriately and accurately.

BRIEF DESCRIPTION OF DRAWINGS

FIG. 4 is a schematic diagram showing a configuration example of a normal control HC increase amount estimation map 212 shown in FIG. 2.

FIG. 5 is a schematic diagram showing a configuration example of a low temperature control HC increase amount estimation map 213 shown in FIG. 2.

FIG. 6 is a schematic diagram showing a configuration example of an HC decrease amount estimation map 214 shown in FIG. 2.

DESCRIPTION OF EMBODIMENTS

Figure 1:
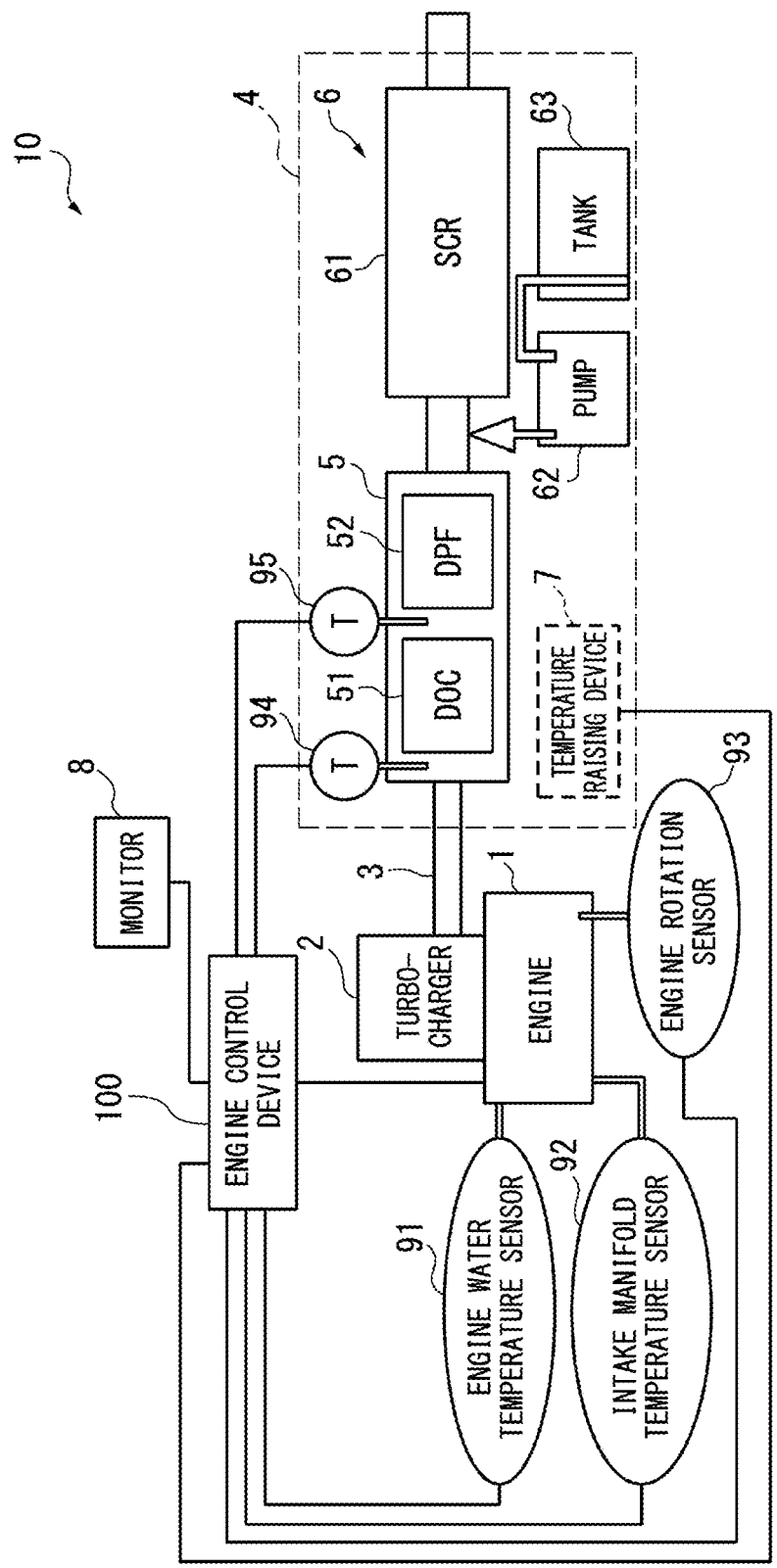
FIG. 1 is a system diagram showing a configuration example of an engine control system according to an embodiment of the present invention.

Hereinafter, embodiments of the present invention will be described with reference to the drawings. In each drawing, the same reference numerals or the same reference numerals with the letter "a" or "b" added to the end are used for the same or corresponding configurations, and the description thereof will be omitted as appropriate.

First Embodiment (Engine Control System 10)

FIG. 1 is a system diagram showing a configuration example of an engine control system 10 as one configuration example of an exhaust gas purification system according to each embodiment of the present invention. The engine control system 10 shown in FIG. 1 includes an engine 1, a turbocharger 2, an exhaust passage 3, an exhaust gas purification device 4, a monitor 8, an engine control device 100, an engine water temperature sensor 91, an intake manifold temperature sensor 92, and an engine rotation sensor 93. In addition, FIG. 1 mainly shows the configuration related to the function of estimating the deposition amount of hydrocarbons (HCs) in the exhaust gas purification device 4 in the engine control system 10 or the engine control device 100 of the present embodiment, and the configuration related to other functions such as fuel injection control is omitted in the drawing as appropriate.

The engine 1 is a configuration example of an internal combustion engine, and is a multi-cylinder diesel engine in the present embodiment. The turbocharger 2 is a supercharger that compresses the intake air of the engine 1 using the exhaust gas of the engine 1. The exhaust passage 3 exhausts the exhaust gas of the engine 1 to the atmosphere through the exhaust gas purification device 4.

The exhaust gas purification device 4 is a device for purifying nitrogen oxides (NOx) and particulate matter (PM) contained in the exhaust gas of the engine 1, and is provided with a DPF device 5 and an SCR device 6 in the exhaust passage 3 of the engine 1, a temperature raising device 7, a temperature sensor 94, and a temperature sensor 95. The DPF device 5 includes a diesel oxidation catalyst (DOC) 51 and a diesel particulate filter (DPF) 52, captures PM with the DPF 52, oxidizes the PM captured downstream with the nitrogen dioxide converted by the DOC 51 into carbon dioxide, and removes the PM. The SCR device 6 includes a selective catalytic reduction (SCR, selective reduction catalyst with ammonia) 61, and a pump 62 and a tank 63 that supply urea water into exhaust gas on the upstream side of the SCR 61, and converts nitrogen oxides (NOx) into nitrogen molecules (N2) and water (H2O).

In addition to NOx and PM, diesel engine exhaust gas also contains hydrocarbons (HCs), and these HCs are deposited in the DOC 51, the DPF 52, and the SCR 61 in an operating region where the operating conditions of the engine are low load (approximately 200 degrees or less upstream of the exhaust gas purification device 4). When this state continues for a long time, the deposition amount of HCs continues to increase. Therefore, the next time the engine 1 is operated under a high load, the temperature inside the exhaust gas purification device 4 rises, the deposited HCs burn rapidly, and there is a risk of damage to the exhaust gas purification device 4. Therefore, when the operating region where the operating conditions of the engine are low load (approximately 200 degrees or less upstream of the exhaust gas purification device 4) continues for a long time, in a case where it is determined that a certain amount of HCs (to the extent that there is no risk of damage) has been deposited, it is necessary to periodically raise the exhaust gas temperature to execute control to release the deposited HCs.

The temperature raising device 7 includes, for example, a fuel injection device, a burner, a heater, an exhaust valve that throttles the exhaust passage 3, and the like, and raises the exhaust gas temperature on the upstream side of the DOC 51. The temperature raising device 7 removes the deposition of PM in the DPF 52 caused by the operating region of the engine 1 and the deposition of urea deposits, which are solid substances derived from urea water, in the exhaust passage 3, and releases the HCs deposited in the DOC 51, the DPF 52, and the SCR 61, and accordingly, the temperature raising device 7 is controlled by the engine control device 100 to raise the exhaust gas temperature in the exhaust gas purification device 4 to the target temperature.

In addition, the temperature sensor 94 measures the inlet temperature of the DOC 51 and outputs the measured result to the engine control device 100. Further, the temperature sensor 95 measures the outlet temperature of the DOC 51 and outputs the measured result to the engine control device 100. The measured value of the temperature sensor 94 and the measured value of the temperature sensor 95 are examples of a fourth measured value corresponding to the temperature inside the exhaust gas purification device 4. One of the temperature sensor 94 and the temperature sensor 95 may be omitted. The fourth measured value is not limited to the inlet temperature or outlet temperature of the DOC 51, and may be the temperature of another location.

The monitor 8 has, for example, a display panel and an input panel, functions as a display device and an input device, and displays predetermined characters and images in response to instructions from the engine control device 100 or outputs signals to the engine control device 100 in response to the input operations of the user (operator).

The engine water temperature sensor 91 measures the temperature of the engine cooling water, which is the cooling liquid of the engine 1 (hereinafter referred to as an engine water temperature), and outputs the measured result to the engine control device 100. The measured value of the engine water temperature sensor 91 is an example of a second measured value corresponding to the temperature of the cooling liquid of the engine 1.

The intake manifold temperature sensor 92 measures the temperature of gas flowing through an intake manifold (not shown) of the engine 1 (hereinafter referred to as intake manifold temperature), and outputs the measured result to the engine control device 100. The measured value of the intake manifold temperature sensor 92 is an example of a first measured value corresponding to the intake air temperature of the engine 1.

The engine rotation sensor 93 measures the rotation speed of the crankshaft of the engine 1 (hereinafter referred to as the engine rotation speed), and outputs the measured result to the engine control device 100. The measured value of this engine rotation sensor 93 is an example of a third measured value corresponding to the exhaust gas flow rate of the engine 1. In addition, the third measured value may be a value obtained by measuring the exhaust gas flow rate itself.

The engine control device 100 repeatedly receives analog or digital sensor signals output from a plurality of sensors including the engine water temperature sensor 91, the intake manifold temperature sensor 92, and the engine rotation sensor 93 at a predetermined cycle, and performs fuel injection control using a plurality of injectors included in the engine 1, control of various motors and valves, automatic control by the temperature raising device 7 such as HC release control deposited in the exhaust gas purification device 4 (hereinafter, this control is referred to as automatic regeneration), or control such as HC release control after fixing the engine rotation speed to a certain rotation speed based on a manual instruction (hereinafter, this control is referred to as stationary manual regeneration).

Stationary manual regeneration is control to stop normal operation and recover the performance of the exhaust gas purification device 4 with the permission of the user when the exhaust gas temperature does not rise sufficiently in the normal operating state (a state where normal work is performed without fixing the engine rotation speed to a certain rotation speed), and PM and urea deposits cannot be removed and HCs cannot be released. In the stationary manual regeneration, the engine control device 100 first uses the monitor 8 to output to the user that the stationary manual regeneration can be performed or that it is required to perform the stationary manual regeneration. In response to this, when the user uses the monitor 8 to give an instruction to execute the stationary manual regeneration, the engine control device 100 fixes the engine rotation speed to a certain rotation speed, raises the exhaust gas temperature, and removes PM or urea deposits and releases HCs.

In addition, in the fuel injection control, the engine control device 100 defines different control states according to at least two temperatures of low temperature control and normal control, performs fuel injection control suitable for low temperatures in low temperature control, and performs fuel injection control suitable for temperatures higher than low temperatures such as normal temperatures in normal control.

(Configuration Example of Engine Control Device 100)

Figure 2:
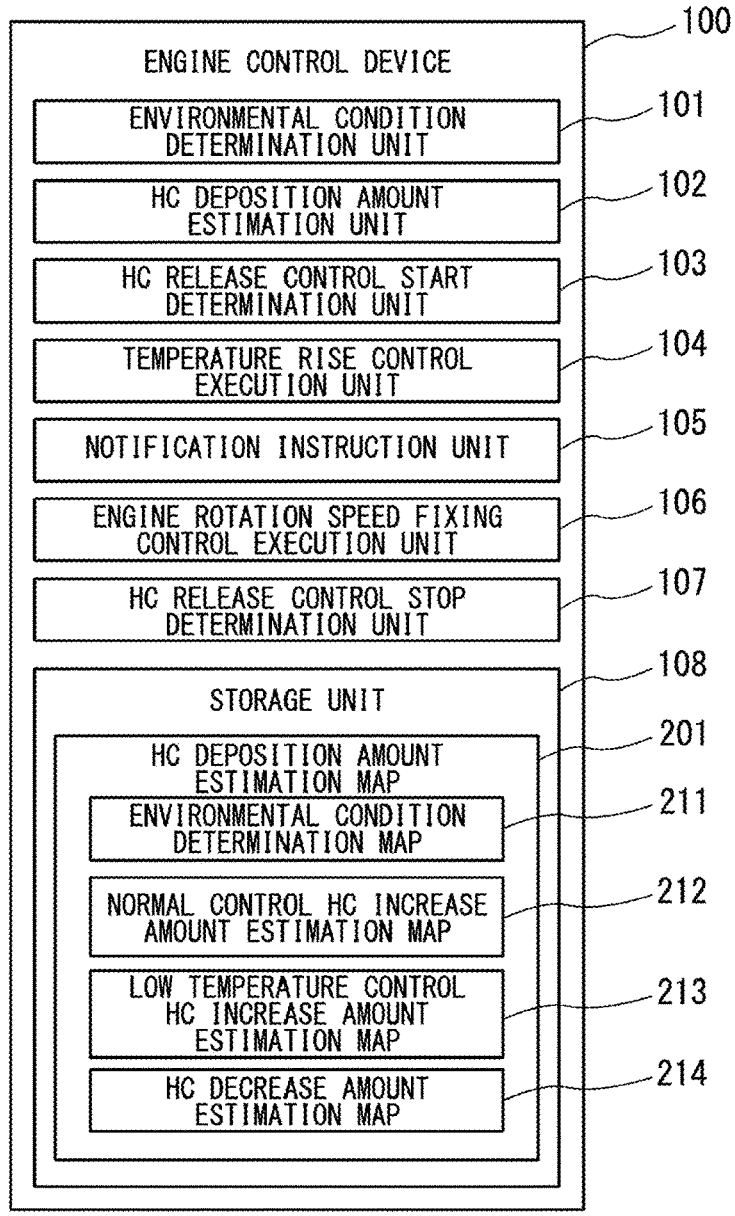
FIG. 2 is a block diagram showing a configuration example of an engine control device 100 shown in FIG. 1.
Figure 3:
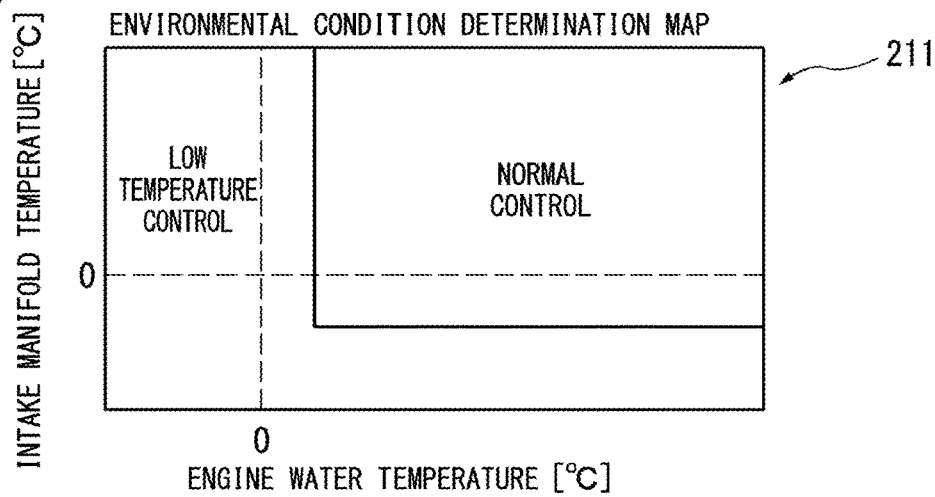
FIG. 3 is a schematic diagram showing a configuration example of an environmental condition determination map 211 shown in FIG. 2.

A configuration example of the engine control device 100 shown in FIG. 1 will be described with reference to FIGS. 2 to 6. FIG. 2 is a block diagram showing a configuration example of the engine control device 100 shown in FIG. 1. FIG. 3 is a schematic diagram showing a configuration example of an environmental condition determination map 211 shown in FIG. 2. FIG. 4 is a schematic diagram showing a configuration example of a normal control HC increase amount estimation map 212 shown in FIG. 2. FIG. 5 is a schematic diagram showing a configuration example of a low temperature control HC increase amount estimation map 213 shown in FIG. 2. FIG. 6 is a schematic diagram showing a configuration example of an HC decrease amount estimation map 214 shown in FIG. 2.

The engine control device 100 shown in FIG. 2 can be configured using, for example, a computer such as a microcomputer, peripheral circuits and peripheral devices of the computer, and as a functional configuration configured of a combination of hardware such as the computer and software such as programs executed by the computer, a plurality of blocks shown in FIG. 2 are provided. In addition, FIG. 2 shows a functional configuration for estimating the deposition amount of HCs in the exhaust gas purification device 4, and a functional configuration related to the release control of HCs based on the estimated result of the deposition amount of HCs, among the plurality of functional configurations of the engine control device 100.

The engine control device 100 shown in FIG. 2 includes an environmental condition determination unit 101, an HC deposition amount estimation unit 102, an HC release control start determination unit 103, a temperature rise control execution unit 104, a notification instruction unit 105, an engine rotation speed fixing control execution unit 106, an HC release control stop determination unit 107, and a storage unit 108. In addition, the storage unit 108 stores an HC deposition amount estimation map 201. The HC deposition amount estimation map 201 includes the environmental condition determination map 211, the normal control HC increase amount estimation map 212, the low temperature control HC increase amount estimation map 213, and the HC decrease amount estimation map 214.

In addition, the HC deposition amount estimation map 201 and other maps that will be described later can be created based on, for example, test results and simulation results using actual machines.

The environmental condition determination unit 101 determines the environmental conditions using the environmental condition determination map 211 based on the intake manifold temperature and the engine water temperature. Here, the environmental conditions are factors occurring around the engine 1 that affect the amount of HCs emitted by the engine 1 (or the exhaust gas temperature of the engine 1). In the present embodiment, the environmental conditions are defined by two states, that is, whether the fuel injection control of the engine 1 is low temperature control or normal control. FIG. 3 shows a configuration example of the environmental condition determination map 211. The environmental condition determination map 211 shown in FIG. 3 is a map that defines environmental conditions (low temperature control or normal control) using the intake manifold temperature and the engine water temperature as parameters. The environmental condition determination map 211 shown in FIG. 3 defines environmental conditions corresponding to the engine water temperature and the intake manifold temperature, with the engine water temperature on the horizontal axis and the intake manifold temperature on the vertical axis. In addition, regarding the engine water temperature, values to the right of "0" are positive values and values to the left of "0" are negative values. Regarding the intake manifold temperature, values above "0" are positive values and values below "0" are negative values.

The HC deposition amount estimation unit 102 calculates an HC deposition amount estimated value in the exhaust gas purification device 4 repeatedly at a predetermined calculation cycle using the following formula.

HC deposition amount estimated value [g]=HC deposition amount estimated value calculated in previous calculation processing [g]+HC increase amount [g]+HC decrease amount [g]

It should be noted that the HC deposition amount estimated value [g] and the HC increase amount [g] are 0 or positive values, and the HC decrease amount [g] is 0 or a negative value.

The HC deposition amount estimation unit 102 first estimates the HC increase amount using the normal control HC increase amount estimation map 212 or the low temperature control HC increase amount estimation map 213 based on the environmental conditions determined by the environmental condition determination unit 101, the engine rotation speed, and the DOC temperature, and estimates the HC decrease amount using the HC decrease amount estimation map 214 based on the engine rotation speed and the DOC temperature. Next, the HC deposition amount estimation unit 102 adds the HC deposition amount estimated value calculated in the calculation processing of the previous calculation cycle and the HC increase amount and HC decrease amount calculated in the current cycle to calculate the HC deposition amount estimated value. In addition, the DOC temperature is, for example, the inlet temperature of the DOC 51 measured by the temperature sensor 94, the outlet temperature of the DOC 51 measured by the temperature sensor 95, or a calculated value (average value and the like) from the inlet temperature and outlet temperature of the DOC 51.

FIG. 4 shows a configuration example of the normal control HC increase amount estimation map 212 (first correspondence information). The normal control HC increase amount estimation map 212 defines the HC increase amount [mg/s] per unit time when the environmental conditions are normal control using the engine rotation speed and the DOC temperature as parameters. When it is determined that the environmental conditions are normal control, by using the normal control HC increase amount estimation map 212, the HC deposition amount estimation unit 102 can acquire the HC increase amount [mg/s] per unit time corresponding to the engine rotation speed and the DOC temperature, and multiplies the HC increase amount per unit time by the calculation cycle [s] to obtain the HC increase amount [g].

FIG. 5 shows a configuration example of the low temperature control HC increase amount estimation map 213 (first correspondence information). The low temperature control HC increase amount estimation map 213 defines the HC increase amount [mg/s] per unit time when the environmental conditions are low temperature control using the engine rotation speed and the DOC temperature as parameters. When it is determined that the environmental conditions are low temperature control, by using the low temperature control HC increase amount estimation map 213, the HC deposition amount estimation unit 102 can acquire the HC increase amount [mg/s] per unit time corresponding to the engine rotation speed and the DOC temperature, and multiplies the HC increase amount per unit time by the calculation cycle [s] to obtain the HC increase amount [g].

FIG. 6 shows a configuration example of the HC decrease amount estimation map 214 (second correspondence information). The HC decrease amount estimation map 214 defines the HC decrease amount [mg/s] per unit time using the engine rotation speed and the DOC temperature as parameters. By using the HC decrease amount estimation map 214, the HC deposition amount estimation unit 102 can acquire the HC decrease amount [mg/s] per unit time corresponding to the engine rotation speed and the DOC temperature, and multiplies the HC decrease amount per unit time by the calculation cycle [s] to obtain the HC decrease amount [g].

The HC release control start determination unit 103 compares the HC deposition amount estimated value estimated by the HC deposition amount estimation unit 102 with a predetermined determination value, and when the HC deposition amount estimated value is equal to or greater than the determination value, it is determined that the HC release control is started. In the HC release control, automatic regeneration and stationary manual regeneration are executed step by step. The determination value is set, for example, to a value that makes it possible to avoid damage due to HC deposition of the exhaust gas purification device 4 with a margin.

When the HC release control start determination unit 103 determines to start the HC release control, the temperature rise control execution unit 104 controls the temperature raising device 7 to execute the automatic regeneration.

The notification instruction unit 105 uses the monitor 8 to issue a notification that the stationary manual regeneration can be performed, to issue a request to execute the stationary manual regeneration, and to accept permission from the user for the execution of the stationary manual regeneration. In that case, the notification instruction unit 105 performs a first notification instruction and a second notification instruction step by step, for example. The first notification instruction is a notification instruction requesting execution of the stationary manual regeneration, but is a notification instruction of which the degree of request is lower than that of the second notification instruction. The first notification instruction is, for example, a notification instruction to execute the stationary manual regeneration at a time convenient for the user. The second notification instruction is a notification instruction requesting execution of the stationary manual regeneration, but is a notification instruction of which the degree of request is higher than that of the first notification instruction. The second notification instruction is, for example, a notification instruction to immediately execute the stationary manual regeneration. In addition, after the execution of the temperature rise control (S203), it is also possible to notify from the monitor 8 that the stationary manual regeneration is possible for a certain period of time before the first notification instruction.

The engine rotation speed fixing control execution unit 106 executes engine rotation speed fixing control when the notification instruction unit 105 accepts permission from the user for execution of the stationary manual regeneration.

The HC release control stop determination unit 107 determines whether the deposited HCs have been released (or whether the amount thereof has decreased to a predetermined amount), and when it is determined that the deposited HCs have been released (or when the amount thereof has decreased to a predetermined amount), the HC release control is stopped.

(Operation Example of Engine Control Device 100)

Figure 7:
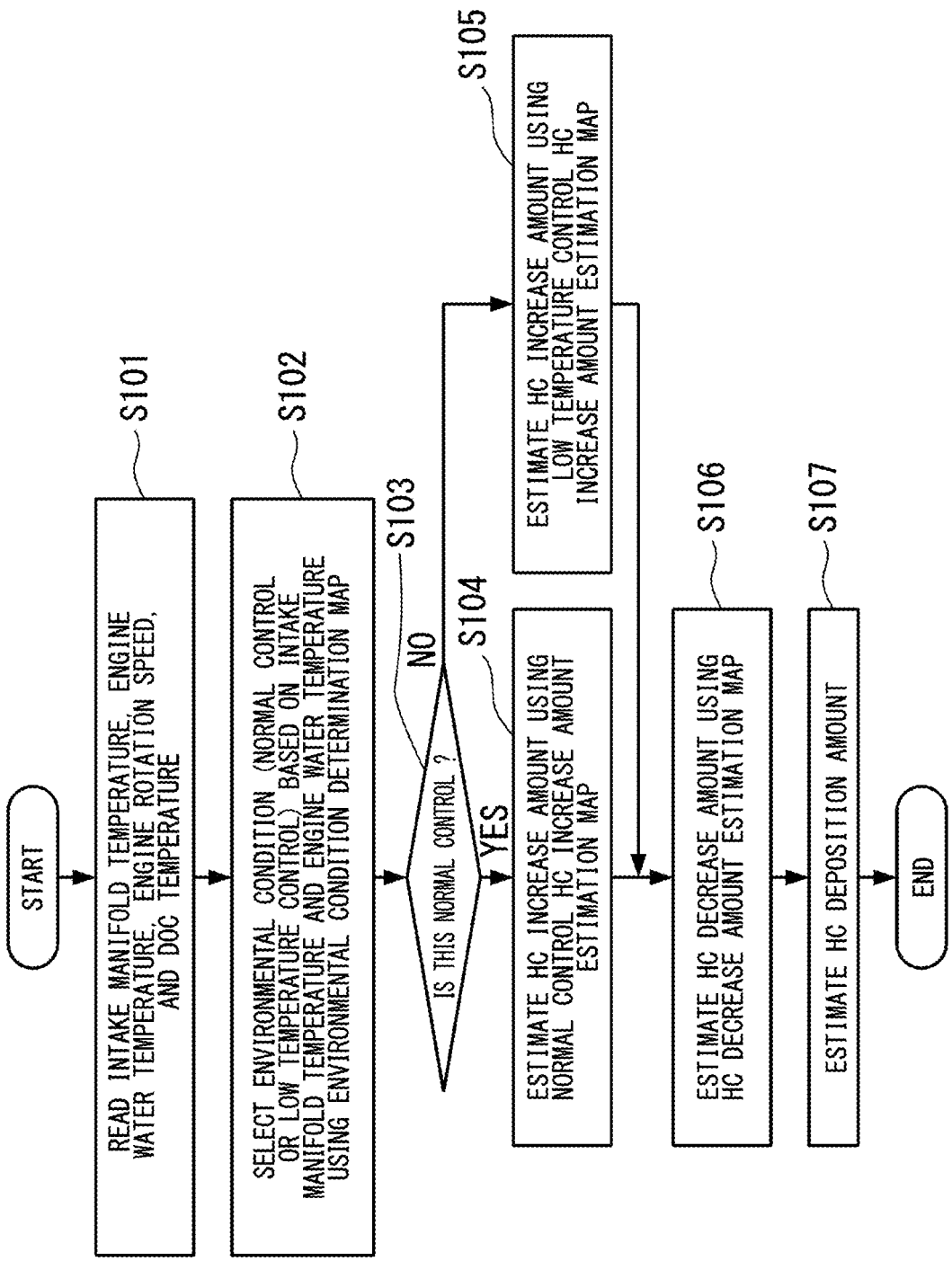
FIG. 7 is a flowchart showing an operation example of the engine control device 100 shown in FIG. 2.
Figure 8:
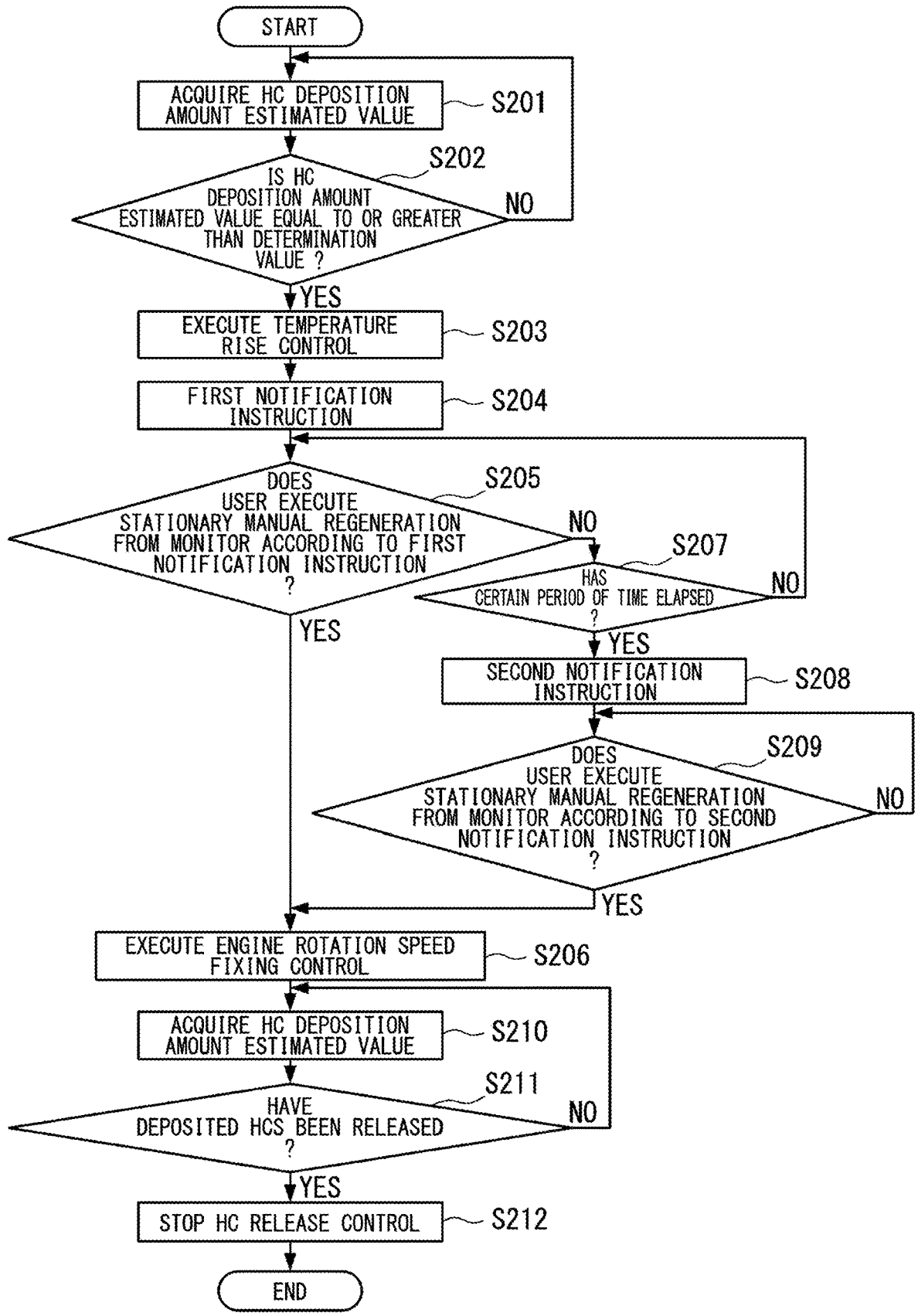
FIG. 8 is a flowchart showing an operation example of the engine control device 100 shown in FIG. 2.
Figure 9:
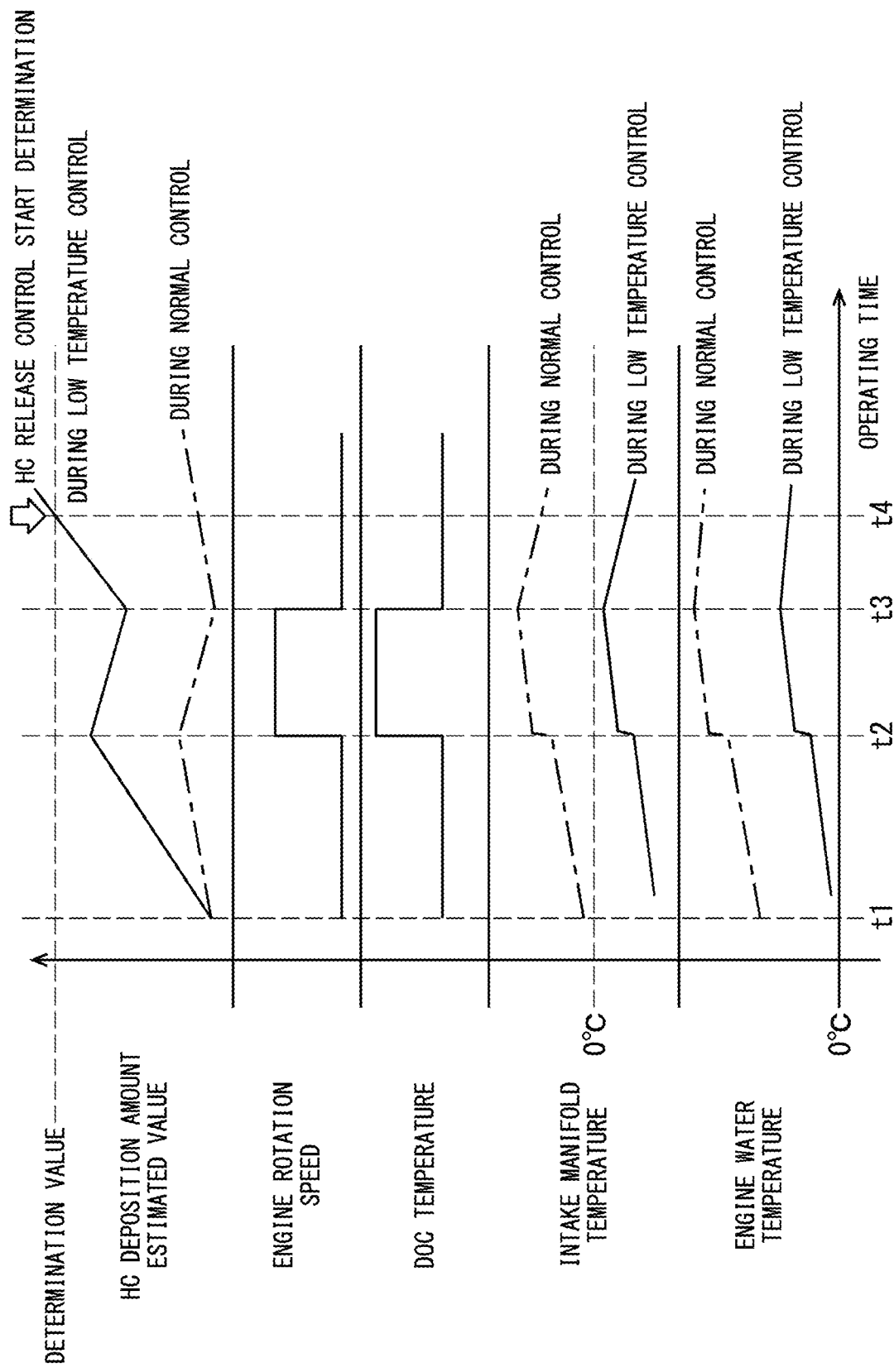
FIG. 9 is a timing chart schematically showing an operation example of the engine control system 10 shown in FIG. 1.

An operation example of the engine control device 100 shown in FIG. 2 will be described with reference to FIGS. 7 to 9. FIGS. 7 and 8 are flowcharts showing an operation example of the engine control device 100 shown in FIG. 2. FIG. 9 is a timing chart schematically showing an operation example of the engine control system 10 shown in FIG. 1.

First, with reference to FIG. 7, the flow of processing when the engine control device 100 shown in FIG. 2 estimates the HC deposition amount will be described. The processing shown in FIG. 7 is repeatedly executed at a predetermined calculation cycle. When the processing shown in FIG. 7 is started, the environmental condition determination unit 101 reads the intake manifold temperature, the engine water temperature, the engine rotation speed, and the DOC temperature (step S101). Next, the environmental condition determination unit 101 selects the environmental condition (normal control or low temperature control) based on the intake manifold temperature and the engine water temperature using the environmental condition determination map 211 (step S102). Next, when it is determined that the environmental condition is normal control ("YES" in step S103), the HC deposition amount estimation unit 102 estimates the HC increase amount using the normal control HC increase amount estimation map 212, based on the engine rotation speed and the DOC temperature (step S104). On the other hand, when it is determined that the environmental condition is low temperature control ("NO" in step S103), the HC deposition amount estimation unit 102 estimates the HC increase amount using the low temperature control HC increase amount estimation map 213, based on the engine rotation speed and the DOC temperature (step S105).

After step S104 or step S105, the HC deposition amount estimation unit 102 estimates the HC decrease amount using the HC decrease amount estimation map 214 based on the engine rotation speed and the DOC temperature (step S106). Next, the HC deposition amount estimation unit 102 estimates the HC deposition amount based on the HC deposition amount estimated value calculated in the previous calculation processing, the HC increase amount, and the HC decrease amount (calculates the HC deposition amount estimated value) (step S107), and ends the processing shown in FIG. 7.

Next, with reference to FIG. 8, the flow of processing when the engine control device 100 shown in FIG. 2 performs the HC release control based on the HC deposition amount estimated value will be described. The processing shown in FIG. 8 is started when the engine control device 100 is operated. When the processing shown in FIG. 8 is started, the HC release control start determination unit 103 acquires the HC deposition amount estimated value estimated by the HC deposition amount estimation unit 102 (step S201), and determines whether or not the HC deposition amount estimated value is equal to or greater than the determination value (step S202). When the HC deposition amount estimated value is not equal to or greater than the determination value ("NO" in step S202), the HC release control start determination unit 103 acquires the HC deposition amount estimated value estimated by the HC deposition amount estimation unit 102 again after a certain period of time has elapsed (step S201).

On the other hand, when the HC deposition amount estimated value is equal to or greater than the determination value ("YES" in step S202), the temperature rise control execution unit 104 starts the temperature rise control through automatic regeneration (step S203). Next, the notification instruction unit 105 executes the first notification instruction from the monitor 8 (step S204). Next, the notification instruction unit 105 determines whether or not there is a response from the monitor 8 such that the request for stationary manual regeneration is accepted in response to the first notification instruction (step S205). When there is a response from the monitor 8 such that the request for stationary manual regeneration is accepted ("YES" in step S205), the engine rotation speed fixing control execution unit 106 executes engine rotation speed fixing control (step S206).

On the other hand, when there is no response from the monitor 8 such that the request for stationary manual regeneration is accepted ("NO" in step S205), the notification instruction unit 105 determines whether or not a certain period of time has elapsed since the first notification instruction was issued (step S207). When a certain period of time has not elapsed and there is no response such that the request for stationary manual regeneration is accepted ("NO" in step S207 and "NO" in step S205), the notification instruction unit 105 repeatedly executes the determination of step S205 and the determination of step S207.

When a certain period of time has elapsed ("YES" in step S207), the notification instruction unit 105 executes the second notification instruction from the monitor 8 (step S208). Next, the notification instruction unit 105 determines whether or not there is a response from the monitor 8 such that the request for stationary manual regeneration is accepted in response to the second notification instruction (step S209). When there is a response from the monitor 8 such that the request for stationary manual regeneration is accepted ("YES" in step S209), the engine rotation speed fixing control execution unit 106 executes engine rotation speed fixing control (step S206). When there is no response from the monitor 8 such that the request for stationary manual regeneration is accepted ("NO" in step S209), the notification instruction unit 105 repeatedly executes the determination processing in step S209 (repeats step S209 from "NO" in step S209).

After step S206, the HC release control stop determination unit 107 acquires the HC deposition amount estimated value estimated by the HC deposition amount estimation unit 102 (step S210), and determines whether or not the deposited HCs have been released (step S211). When the deposited HCs have not been released ("NO" in step S211), the HC release control stop determination unit 107 acquires the HC deposition amount estimated value estimated by the HC deposition amount estimation unit 102 again after a certain period of time has elapsed (step S210). On the other hand, when the deposited HCs have been released ("YES" in step S211), the HC release control stop determination unit 107 stops HC release control (step S212), and ends the processing shown in FIG. 8.

It should be noted that the flow of processing shown in FIG. 8 is an example and can be changed as appropriate. For example, when the determination in step S209 is repeatedly "NO", the HC release control stop determination unit 107 may repeatedly perform acquisition of the HC deposition amount estimated value and determination on whether or not the deposited HCs have been released. When it is determined that the HC has been released, the second notification instruction may be withdrawn and the processing may return to step S201. For example, it is possible to cope with a case where HC is released due to a change in operating states and an increase in the DOC temperature. In addition, the normal control HC increase amount estimation map 212 and the low temperature control HC increase amount estimation map 213, which are examples of the first correspondence information, or the HC decrease amount estimation map 214, which is an example of the second correspondence information, are not limited to a map, and may be configured as a formula for calculating the HC increase amount or HC decrease amount using the engine rotation speed and the DOC temperature as parameters. In this case, this formula is also an example of the first and second correspondence information.

(Action/Effect)

FIG. 9 schematically shows an example of temporal changes in HC deposition amount estimated value, engine rotation speed, DOC temperature, intake manifold temperature, and engine water temperature. As shown in FIG. 9, when the engine 1 is operated at t1 and the low load state (a state where the engine exhaust gas temperature is low) of the engine 1 continues until time t2, the HC deposition amount estimated value gradually increases. When the engine 1 changes from a low load state to a higher load state from time t2 to time t3, the HC deposition amount estimated value gradually decreases from time t2 to time t3. In the example shown in FIG. 9, the increase rate of the HC deposition amount estimated value is higher during the low temperature control than during the normal operation, and thus, although the deposition amount decreases from time t2, the deposition amount is still greater at time t3 than during the normal control. Then, when the engine 1 returns to the low load state at time t3, the HC deposition amount estimated value increases again during the low temperature control, and exceeds the determination value at time t4 in the example shown in FIG. 9.

Figure 22:
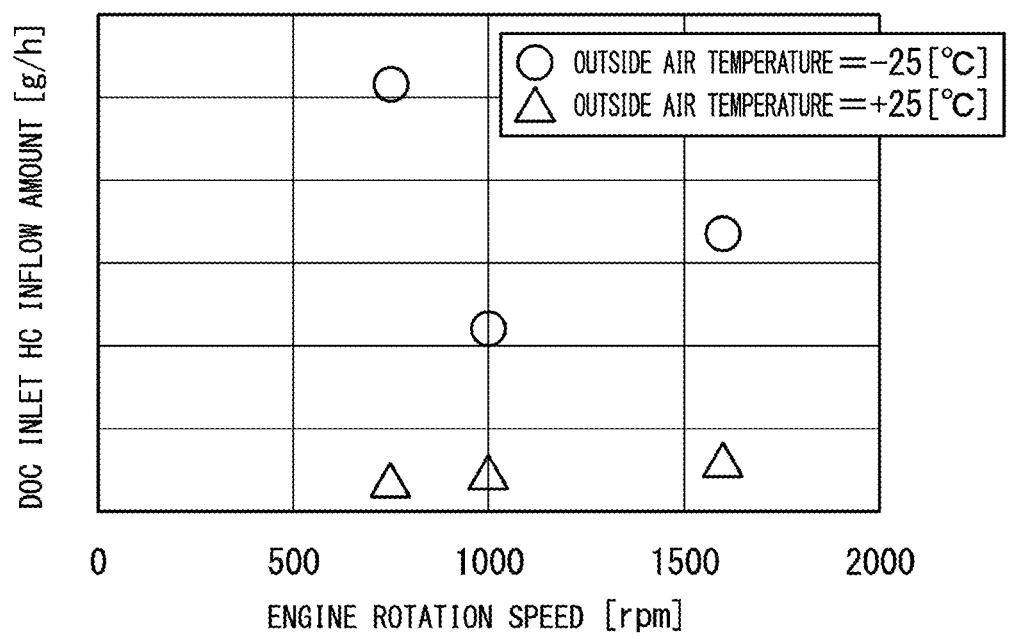
FIG. 22 is an explanatory diagram for explaining an operation example of the engine control system 10 shown in FIG. 1.

For example, when the estimation accuracy of the HC deposition amount is low, it is necessary to make the degree of margin for the determination value sufficiently large (for example, it is necessary to perform comparison with the determination value in accordance with the case where the error is maximum). Even in the case of a reference example, as shown in FIG. 22, dependence of the DOC input HC inflow amount on the engine rotation speed greatly varies according to the outside air temperature. When the deposition amount can be estimated accurately corresponding to the change in the degree of dependence, the degree of margin for the determination value can be reduced. That is, when the estimation accuracy is high, the degree of margin for the determination value can be made smaller than when the accuracy is low. In this case, when the estimation accuracy is high, it is possible to reduce the error between the time when the deposition amount actually exceeds the determination value and the time when it is determined that the deposition amount exceeds the determination value based on the estimated value. Therefore, by increasing the estimation accuracy, it is possible to delay the time until the control that involves fixing the engine rotation speed is started. As a result, the time during which the normal operating state can be continued can be extended when the estimation accuracy is high compared to when the estimation accuracy is low. In addition, FIG. 22 is an explanatory diagram for explaining an operation example of the engine control system 10 shown in FIG. 1, and shows the relationship between the engine rotation speed and the DOC input HC inflow amount.

According to the present embodiment, the engine control device 100 (hydrocarbon deposition amount estimation device) includes the hydrocarbon (HG) deposition amount estimation unit 102 that estimates the deposition amount of hydrocarbons (HCs) deposited in the exhaust gas purification device 4 of the internal combustion engine equipped with the oxidation catalyst based on at least the first measured value corresponding to the intake air temperature of the internal combustion engine, the second measured value corresponding to the temperature of the cooling liquid of the internal combustion engine, and the third measured value corresponding to the exhaust gas flow rate of the internal combustion engine. Therefore, it is possible to estimate the hydrocarbon (HG) deposition amount appropriately and accurately.

In addition, according to the present embodiment, there is provided the engine control device 100 (hydrocarbon deposition amount estimation device), further including the storage unit 108 that stores the first correspondence information representing the correspondence of the third measured value, the fourth measured value corresponding to the temperature inside the exhaust gas purification device 4, and the increase amount of HCs deposited in the exhaust gas purification device 4, according to environmental conditions of the internal combustion engine, in which the HC deposition amount estimation unit 102 estimates the increase amount based on the environmental conditions of the internal combustion engine determined based on the first measured value and the second measured value, the third measured value, the fourth measured value, and the first correspondence information when estimating the deposition amount. According to this configuration, it is possible to estimate the increase amount in hydrocarbons (HCs) appropriately and accurately using the first correspondence information corresponding to the environmental conditions, which can be configured using a map, a simple calculation formula, or the like.

In addition, according to the present embodiment, the storage unit 108 further stores the second correspondence information representing the correspondence of the third measured value, the fourth measured value, and the decrease amount in HCs deposited in the exhaust gas purification device 4, and the HC deposition amount estimation unit 102 estimates the decrease amount based on the third measured value, the fourth measured value, and the second correspondence information when estimating the deposition amount. According to this configuration, it is possible to estimate the increase amount in hydrocarbons (HCs) appropriately and accurately using the first correspondence information corresponding to the environmental conditions, which can be configured using a map, a simple calculation formula, or the like. According to this configuration, it is possible to estimate the decrease amount in hydrocarbons (HCs) appropriately and accurately using the second correspondence information which can be configured using a map, a simple calculation formula, or the like.

Second Embodiment

Figure 10:
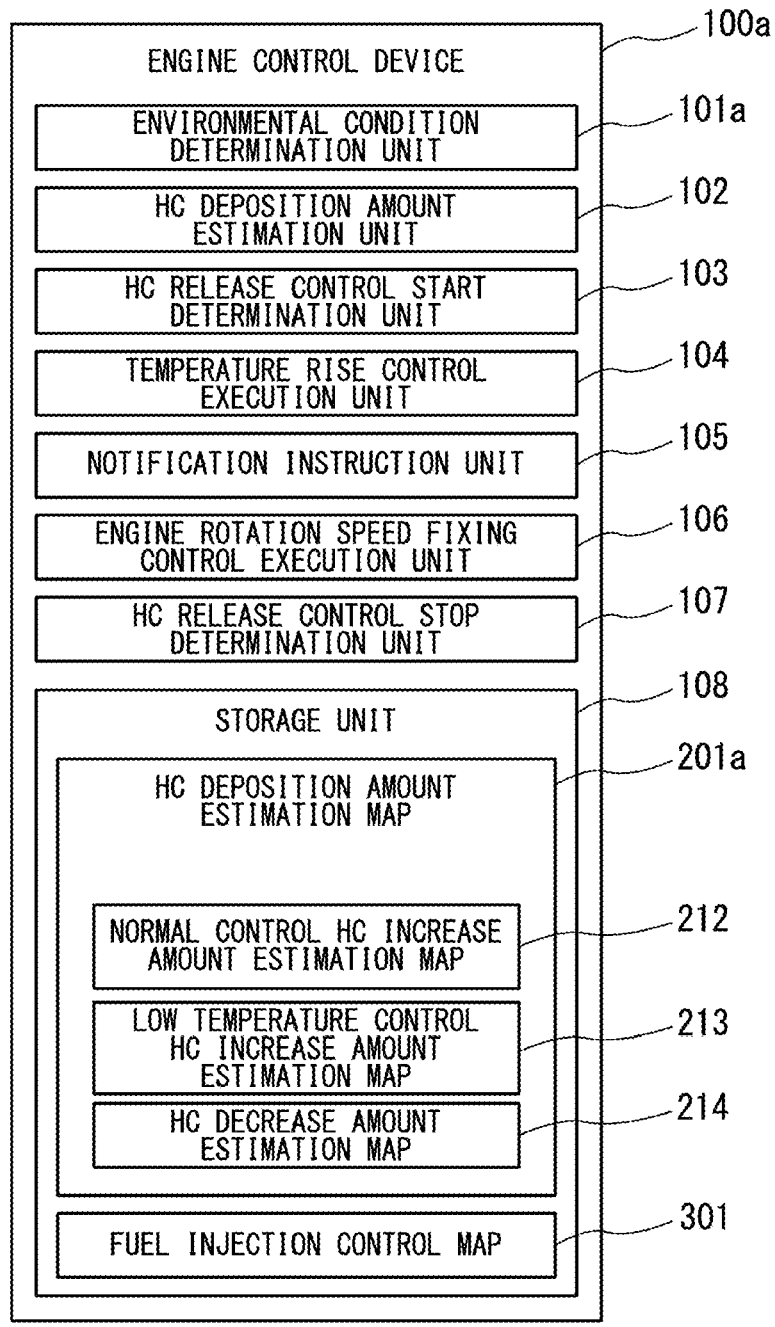
FIG. 10 is a block diagram showing a configuration example of the engine control device 100 (engine control device 100a) shown in FIG. 1.
Figure 11:
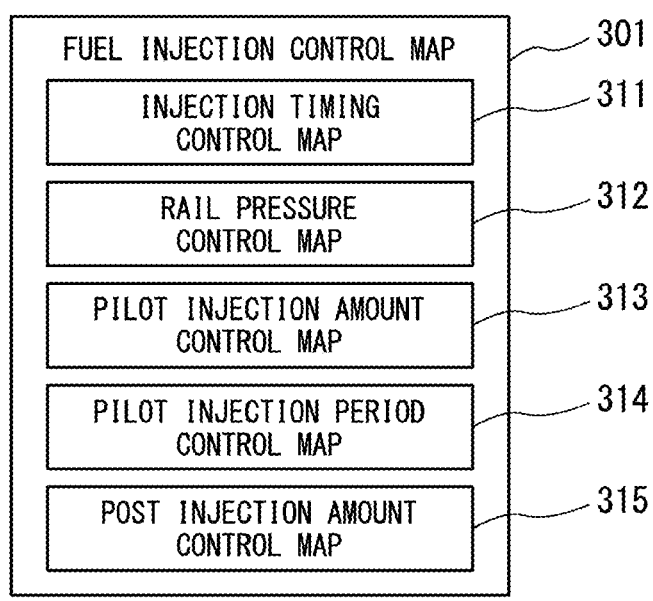
FIG. 11 is a block diagram showing a configuration example of a map included in a fuel injection control map 301 shown in FIG. 10.
Figure 12:
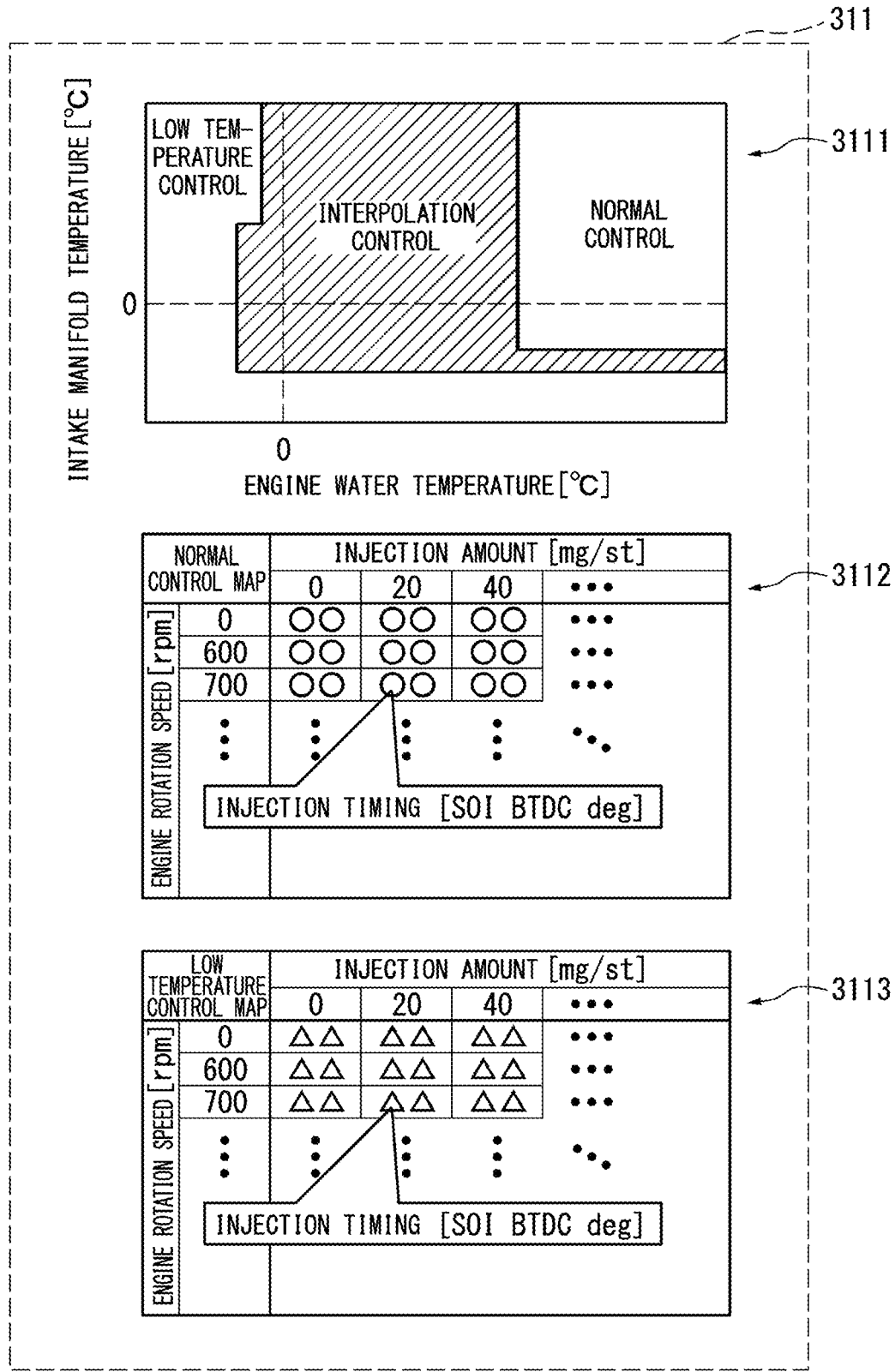
FIG. 12 is a schematic diagram showing a configuration example of an injection timing control map 311 shown in FIG. 11.
Figure 13:
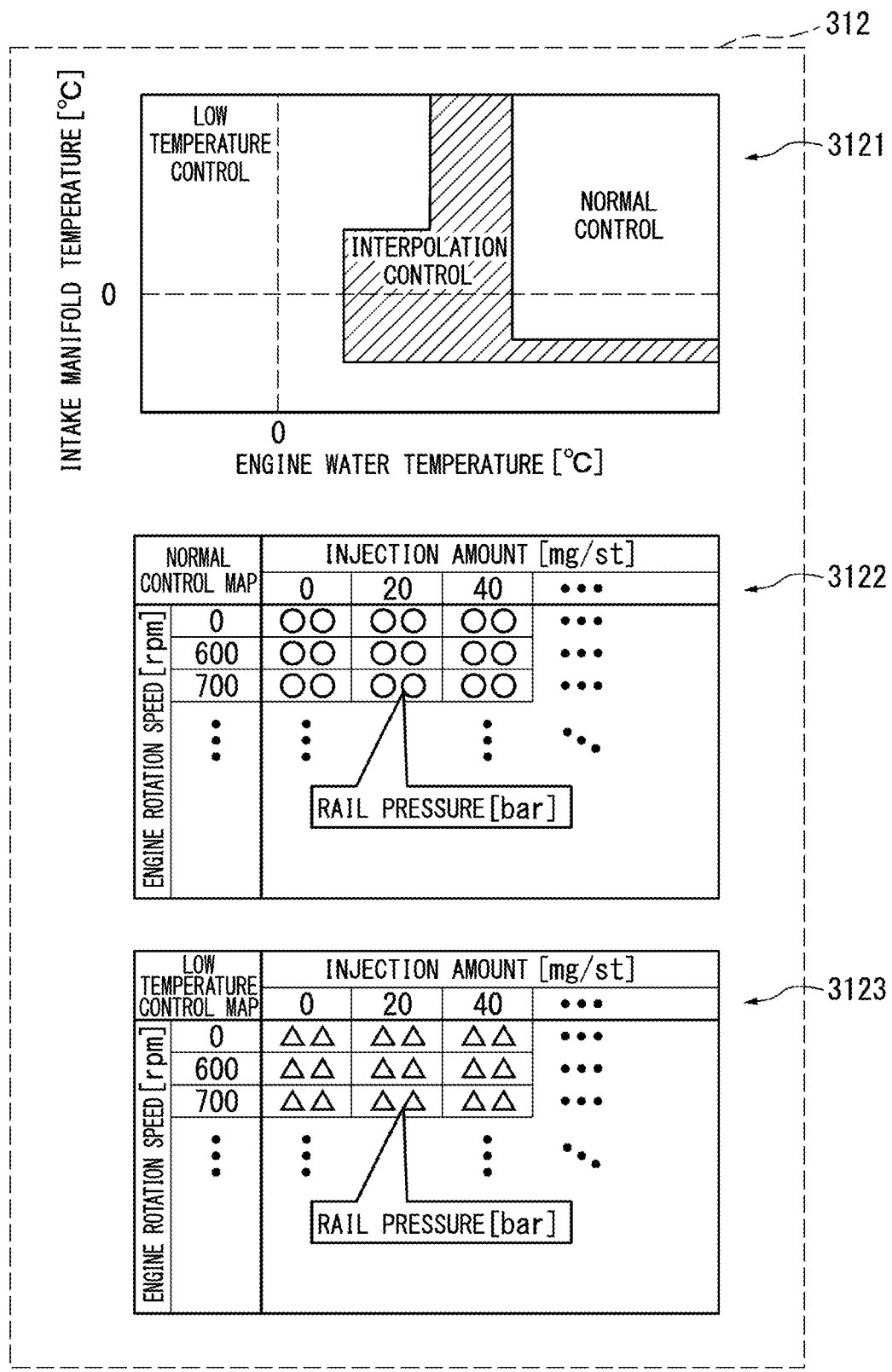
FIG. 13 is a schematic diagram showing a configuration example of a rail pressure control map 312 shown in FIG. 11.
Figure 14:
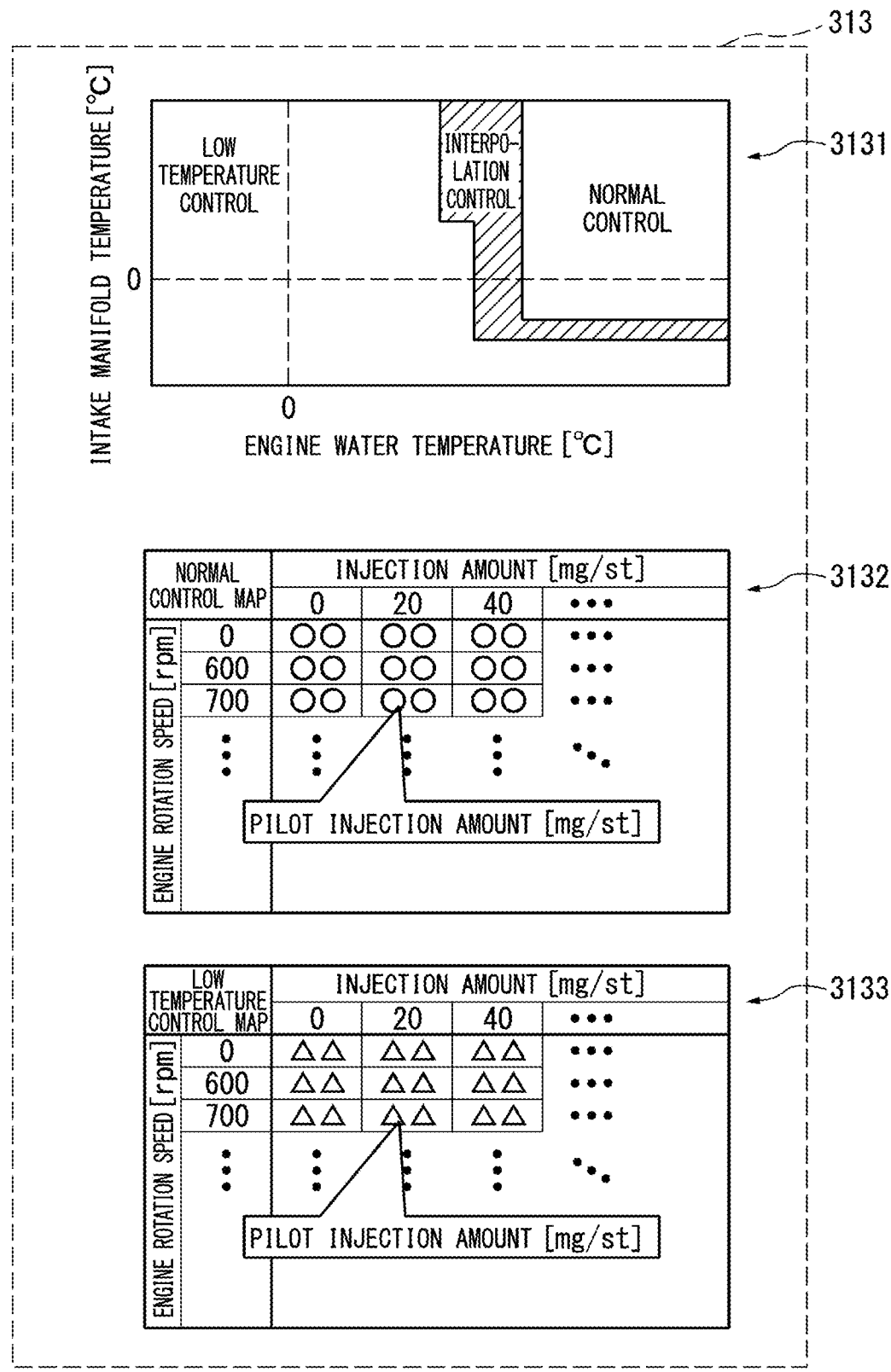
FIG. 14 is a schematic diagram showing a configuration example of a pilot injection amount control map 313 shown in FIG. 11.
Figure 15:
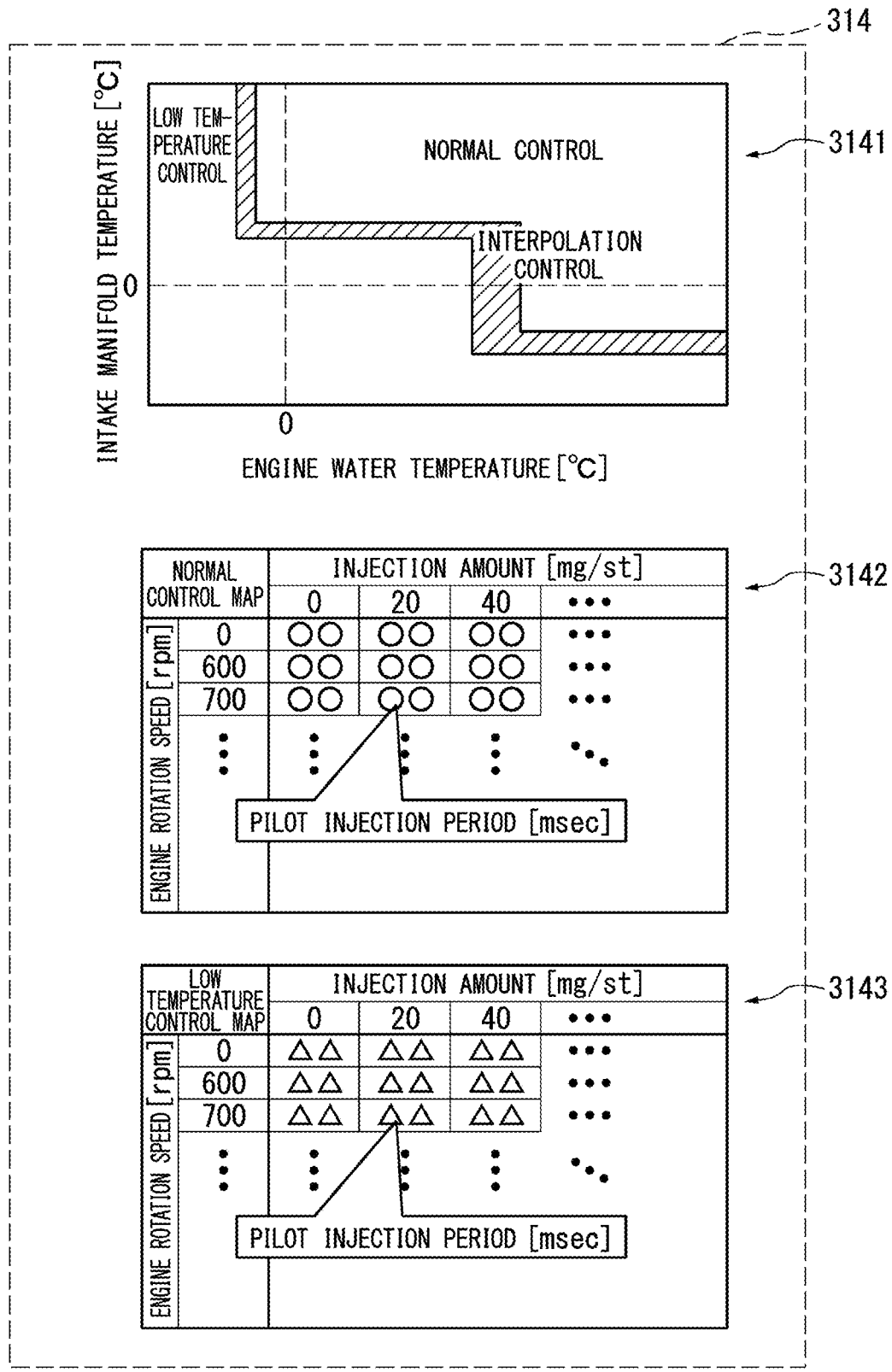
FIG. 15 is a schematic diagram showing a configuration example of a pilot injection period control map 314 shown in FIG. 11.
Figure 16:
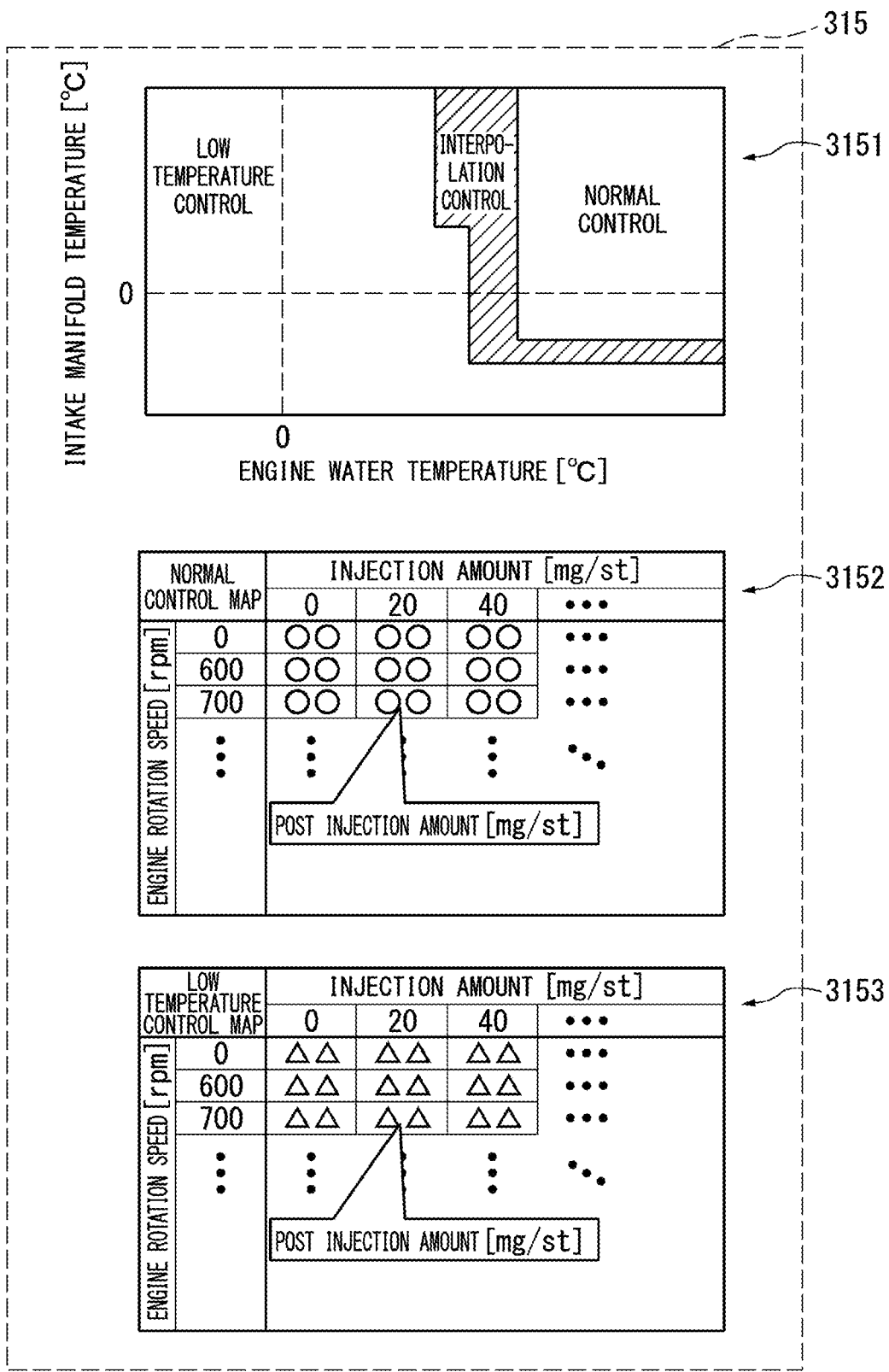
FIG. 16 is a schematic diagram showing a configuration example of a post injection amount control map 315 shown in FIG. 11.
Figure 17:
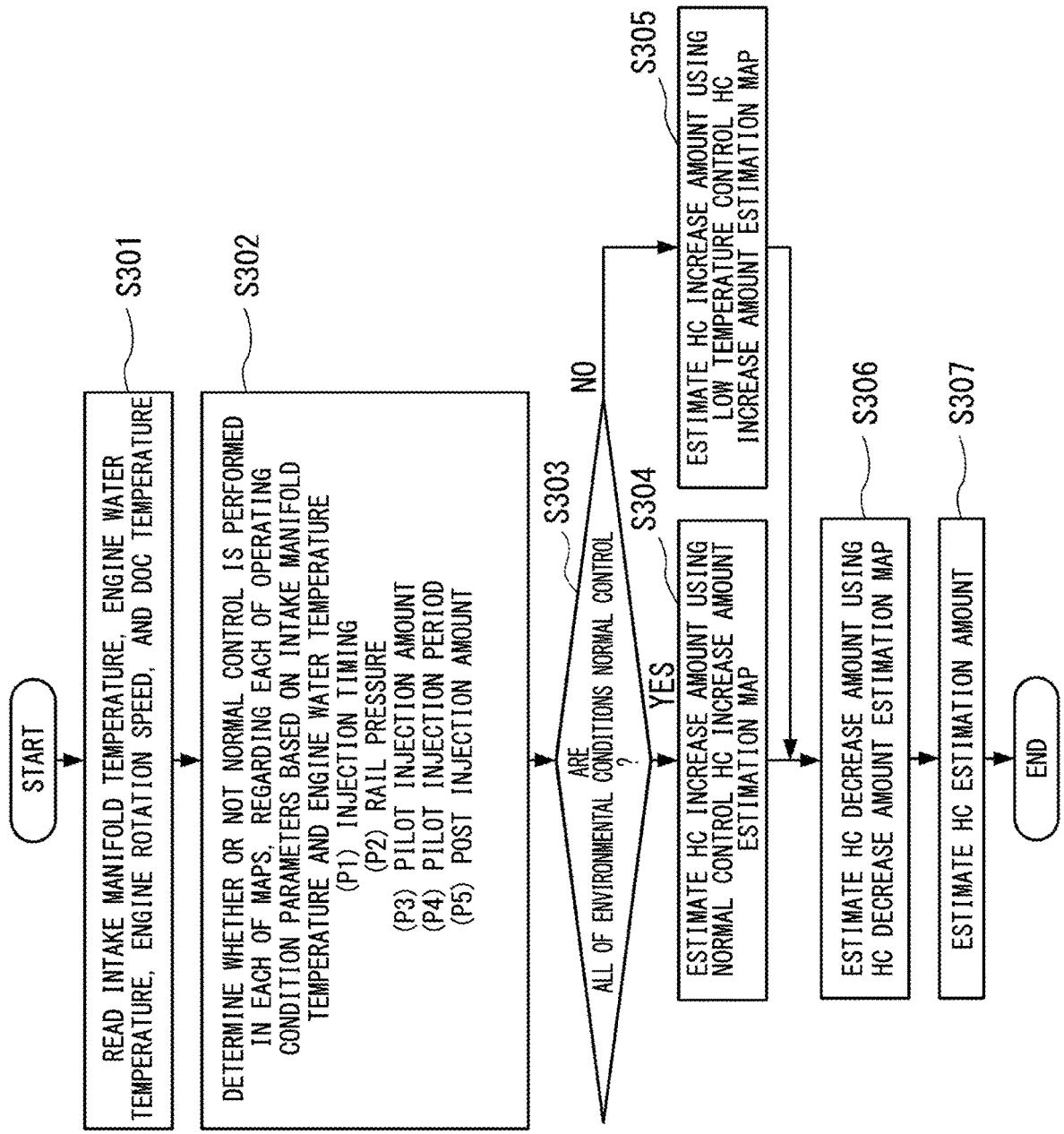
FIG. 17 is a flowchart showing an operation example of the engine control device 100a shown in FIG. 10.

Next, a second embodiment of the present invention will be described with reference to FIGS. 10 to 17. FIG. 10 is a block diagram showing a configuration example of the engine control device 100 (referred to as an engine control device 100a) shown in FIG. 1. FIG. 11 is a block diagram showing a configuration example of a map included in a fuel injection control map 301 shown in FIG. 10. FIG. 12 is a schematic diagram showing a configuration example of an injection timing control map 311 shown in FIG. 11. FIG. 13 is a schematic diagram showing a configuration example of a rail pressure control map 312 shown in FIG. 11. FIG. 14 is a schematic diagram showing a configuration example of a pilot injection amount control map 313 shown in FIG. 11. FIG. 15 is a schematic diagram showing a configuration example of a pilot injection period control map 314 shown in FIG. 11. FIG. 16 is a schematic diagram showing a configuration example of a post injection amount control map 315 shown in FIG. 11. FIG. 17 is a flowchart showing an operation example of the engine control device 100a shown in FIG. 10.

In the second embodiment, the basic configuration of the engine control system 10 shown in FIG. 1 is the same as in the first embodiment. In the second embodiment, the configuration of the engine control device 100a shown in FIG. 10, which corresponds to the configuration of the engine control device 100 shown in FIG. 2, is partially different from the configuration of the engine control device 100 shown in FIG. 2. That is, in the engine control device 100 shown in FIG. 2, the environmental condition determination unit 101 uses the environmental condition determination map 211 to determine the environmental conditions, while in the engine control device 100a shown in FIG. 10, an environmental condition determination unit 101a determines the environmental conditions using the fuel injection control map 301. In the engine control device 100a shown in FIG. 10, the HC deposition amount estimation map 201a stored in the storage unit 108 does not include the environmental condition determination map 211. Further, the storage unit 108 newly stores the fuel injection control map 301.

As shown in FIG. 11, the fuel injection control map 301 shown in FIG. 10 includes the injection timing control map 311, the rail pressure control map 312, the pilot injection amount control map 313, the pilot injection period control map 314, and the post injection amount control map 315, which are used by the engine control device 100a for fuel injection control.

As shown in FIG. 12, the injection timing control map 311 includes an environmental condition determination map 3111, a normal control map 3112, and a low temperature control map 3113. The environmental condition determination map 3111 is a map that defines environmental conditions using the engine water temperature and the intake manifold temperature as parameters. In this case, the environmental conditions are defined by three states: normal control, low temperature control, and interpolation control. The normal control map 3112 and the low temperature control map 3113 are maps that define the injection timing [SOI BTDC deg] of the main injection during the normal control and the injection timing [SOI BTDC deg] of the main injection during the low temperature control using the engine rotation speed [rpm] and the injection amount [mg/st] of the main injection as parameters. Here, "st" indicates a stroke, and "SOT BTDC deg" indicates a start-of-injection before-top-dead-center angle. The injection amount of the main injection is determined, for example, according to the output signal of an accelerator sensor (not shown).

The engine control device 100a determines the environmental conditions using the environmental condition determination map 3111 based on the engine water temperature and the intake manifold temperature. Further, when the environmental condition is normal control, the engine control device 100a uses the normal control map 3112 to determine the injection timing based on the engine rotation speed and the injection amount of the main injection. Further, when the environmental condition is low temperature control, the engine control device 100a uses the low temperature control map 3113 to determine the injection timing based on the engine rotation speed and the injection amount of the main injection. Further, when the environmental condition is interpolation control, the engine control device 100a uses the normal control map 3112 and the low temperature control map 3113 to determine the injection timing as a result of interpolation processing (interpolating process) using the values of the normal control map 3112 and the values of the low temperature control map 3113 based on the engine rotation speed and the injection amount of the main injection.

Moreover, as shown in FIG. 13, the rail pressure control map 312 includes an environmental condition determination map 3121, a normal control map 3122, and a low temperature control map 3123. The environmental condition determination map 3121 is a map that defines environmental conditions using the engine water temperature and the intake manifold temperature as parameters. In this case, the environmental conditions are defined by three states: normal control, low temperature control, and interpolation control. The normal control map 3122 and the low temperature control map 3123 are maps that define the rail pressure (rail pressure of common rail) [bar] during the normal control and the rail pressure [bar] during the low temperature control using the engine rotation speed [rpm] and the injection amount [mg/st] of the main injection as parameters.

The engine control device 100a determines the environmental conditions using the environmental condition determination map 3121 based on the engine water temperature and the intake manifold temperature. Further, when the environmental condition is normal control, the engine control device 100a uses the normal control map 3122 to determine the rail pressure based on the engine rotation speed and the injection amount of the main injection. Further, when the environmental condition is low temperature control, the engine control device 100a uses the low temperature control map 3123 to determine the rail pressure based on the engine rotation speed and the injection amount of the main injection. Further, when the environmental condition is interpolation control, the engine control device 100a uses the normal control map 3122 and the low temperature control map 3123 to determine the rail pressure as a result of interpolation processing (interpolating process) using the values of the normal control map 3122 and the values of the low temperature control map 3123 based on the engine rotation speed and the injection amount of the main injection.

Moreover, as shown in FIG. 14, the pilot injection amount control map 313 includes an environmental condition determination map 3131, a normal control map 3132, and a low temperature control map 3133. The environmental condition determination map 3131 is a map that defines environmental conditions using the engine water temperature and the intake manifold temperature as parameters. In this case, the environmental conditions are defined by three states: normal control, low temperature control, and interpolation control. The normal control map 3132 and the low temperature control map 3133 are maps that define the pilot injection amount [mg/st] during the normal control and the pilot injection amount [mg/st] during the low temperature control using the engine rotation speed [rpm] and the injection amount [mg/st] of the main injection as parameters.

The engine control device 100a determines the environmental conditions using the environmental condition determination map 3131 based on the engine water temperature and the intake manifold temperature. Further, when the environmental condition is normal control, the engine control device 100a uses the normal control map 3132 to determine the pilot injection amount based on the engine rotation speed and the injection amount of the main injection. Further, when the environmental condition is low temperature control, the engine control device 100a uses the low temperature control map 3133 to determine the pilot injection amount based on the engine rotation speed and the injection amount of the main injection. Further, when the environmental condition is interpolation control, the engine control device 100a uses the normal control map 3132 and the low temperature control map 3133 to determine the pilot injection amount as a result of interpolation processing (interpolating process) using the values of the normal control map 3132 and the values of the low temperature control map 3133 based on the engine rotation speed and the injection amount of the main injection.

Moreover, as shown in FIG. 15, the pilot injection period control map 314 includes an environmental condition determination map 3141, a normal control map 3142, and a low temperature control map 3143. The environmental condition determination map 3141 is a map that defines environmental conditions using the engine water temperature and the intake manifold temperature as parameters. In this case, the environmental conditions are defined by three states: normal control, low temperature control, and interpolation control. The normal control map 3142 and the low temperature control map 3143 are maps that define the pilot injection period [msec] during the normal control and the pilot injection period [msec] during the low temperature control using the engine rotation speed [rpm] and the injection amount [mg/st] of the main injection as parameters.

The engine control device 100a determines the environmental conditions using the environmental condition determination map 3141 based on the engine water temperature and the intake manifold temperature. Further, when the environmental condition is normal control, the engine control device 100a uses the normal control map 3142 to determine the pilot injection period based on the engine rotation speed and the injection amount of the main injection. Further, when the environmental condition is low temperature control, the engine control device 100a uses the low temperature control map 3143 to determine the pilot injection period based on the engine rotation speed and the injection amount of the main injection. Further, when the environmental condition is interpolation control, the engine control device 100a uses the normal control map 3142 and the low temperature control map 3143 to determine the pilot injection period as a result of interpolation processing (interpolating process) using the values of the normal control map 3142 and the values of the low temperature control map 3143 based on the engine rotation speed and the injection amount of the main injection.

Moreover, as shown in FIG. 16, the post injection amount control map 315 includes an environmental condition determination map 3151, a normal control map 3152, and a low temperature control map 3153. The environmental condition determination map 3151 is a map that defines environmental conditions using the engine water temperature and the intake manifold temperature as parameters. In this case, the environmental conditions are defined by three states: normal control, low temperature control, and interpolation control. The normal control map 3152 and the low temperature control map 3153 are maps that define the post injection amount [mg/st] during the normal control and the post injection amount [mg/st] during the low temperature control using the engine rotation speed [rpm] and the injection amount [mg/st] of the main injection as parameters.

The engine control device 100a determines the environmental conditions using the environmental condition determination map 3151 based on the engine water temperature and the intake manifold temperature. Further, when the environmental condition is normal control, the engine control device 100a uses the normal control map 3152 to determine the post injection amount based on the engine rotation speed and the injection amount of the main injection. Further, when the environmental condition is low temperature control, the engine control device 100a uses the low temperature control map 3153 to determine the post injection amount based on the engine rotation speed and the injection amount of the main injection. Further, when the environmental condition is interpolation control, the engine control device 100a uses the normal control map 3152 and the low temperature control map 3153 to determine the post injection amount as a result of interpolation processing (interpolating process) using the values of the normal control map 3152 and the values of the low temperature control map 3153 based on the engine rotation speed and the injection amount of the main injection.

Next, with reference to FIG. 17, the flow of processing when the engine control device 100a shown in FIG. 10 estimates the HC deposition amount will be described. The processing shown in FIG. 17 is repeatedly executed at a predetermined calculation cycle. When the processing shown in FIG. 17 is started, the environmental condition determination unit 101a reads the intake manifold temperature, the engine water temperature, the engine rotation speed, and the DOC temperature (step S301). Next, the environmental condition determination unit 101a determines whether or not normal control is performed in each of the environmental condition determination maps 3111, 3121, 3131, 3141, and 3151, regarding each of the operating condition parameters (P1) to (P5) below based on the intake manifold temperature and the engine water temperature (step S302). Here, the parameter (P1) is the injection timing, the parameter (P2) is the rail pressure, the parameter (P3) is the pilot injection amount, the parameter (P4) is the pilot injection period, and the parameter (P5) is the post injection amount.

Next, regarding each of the operating condition parameters (P1) to (P5), when it is determined that all of the environmental conditions are "normal control" ("YES" in step S303), the HC deposition amount estimation unit 102 estimates the HC increase amount using the normal control HC increase amount estimation map 212 based on the engine rotation speed and the DOC temperature (step S304). On the other hand, when it is determined that even one of the environmental conditions is not normal control ("NO" in step S303), the HC deposition amount estimation unit 102 estimates the HC increase amount using the low temperature control HC increase amount estimation map 213, based on the engine rotation speed and the DOC temperature (step S305).

After step S304 or step S305, the HC deposition amount estimation unit 102 estimates the HC decrease amount using the HC decrease amount estimation map 214 based on the engine rotation speed and the DOC temperature (step S306). Next, the HC deposition amount estimation unit 102 estimates the HC deposition amount based on the HC deposition amount estimated value calculated in the previous calculation processing, the HC increase amount, and the HC decrease amount (calculates the HC deposition amount estimated value) (step S307), and ends the processing shown in FIG. 17.

The processing described with reference to FIG. 8 is common to the first embodiment and the second embodiment.

According to the present embodiment, the engine control device 100 (hydrocarbon deposition amount estimation device) includes the hydrocarbon (HC) deposition amount estimation unit 102 that estimates the deposition amount of hydrocarbons (HCs) deposited in the exhaust gas purification device 4 of the internal combustion engine equipped with the oxidation catalyst based on at least the first measured value corresponding to the intake air temperature of the internal combustion engine, the second measured value corresponding to the temperature of the cooling liquid of the internal combustion engine, and the third measured value corresponding to the exhaust gas flow rate of the internal combustion engine. Therefore, it is possible to estimate the hydrocarbon (HC) deposition amount appropriately and accurately.

Further, in the present embodiment, the environmental conditions include factors related to at least one of the injection timing, the rail pressure, the pilot injection amount, the pilot injection period, and the post injection amount, which are related to fuel injection control of the internal combustion engine. Therefore, the environmental conditions can be defined as being more suitable for the content of the fuel injection control.

Third Embodiment

Figures 18, 19:
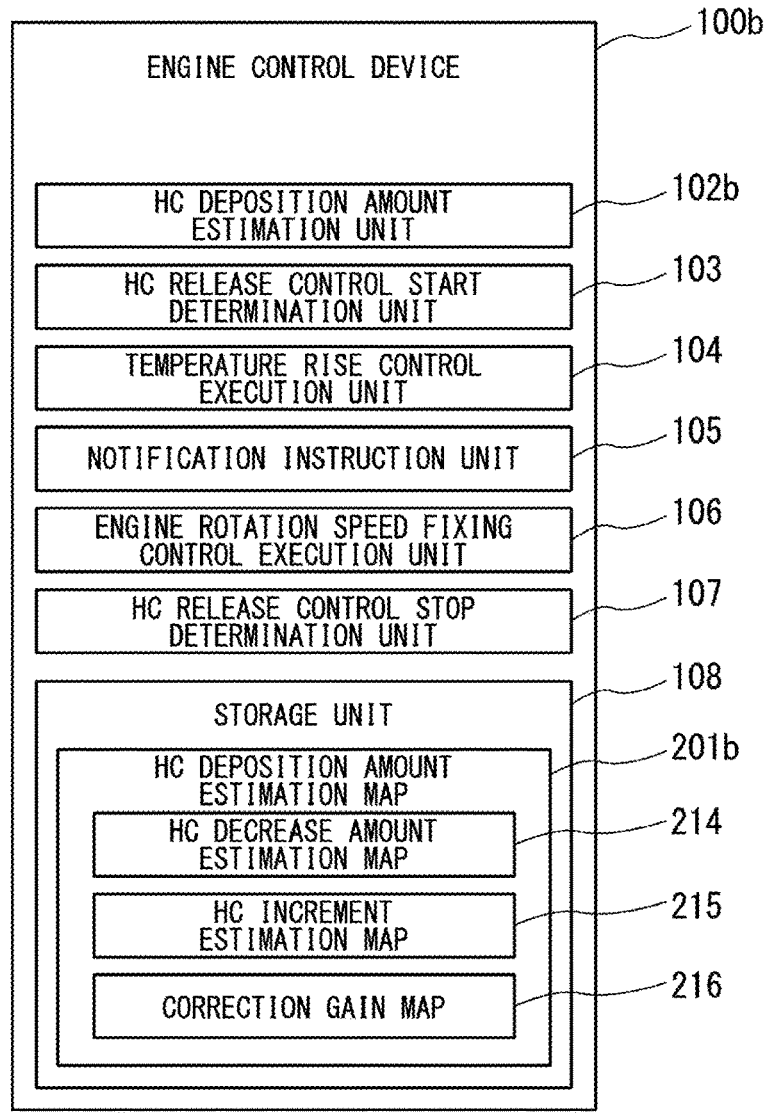
FIG. 18 is a block diagram showing a configuration example of the engine control device 100 (engine control device 100b) shown in FIG. 1.
FIG. 19 is a schematic diagram showing a configuration example of an HC increment estimation map 215 shown in FIG. 18.
Figures 20, 21:
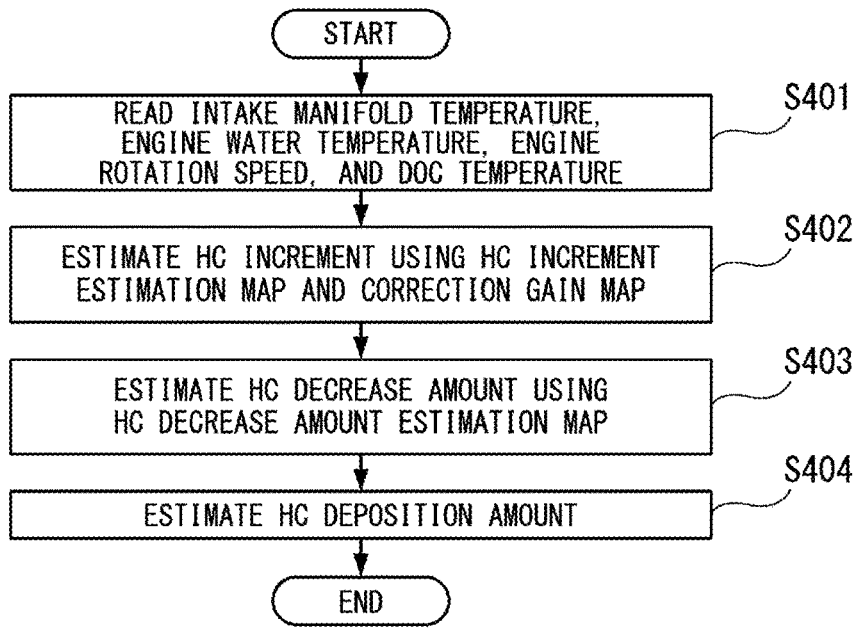
FIG. 20 is a schematic diagram showing a configuration example of a correction gain map 216 shown in FIG. 18.
FIG. 21 is a flowchart showing an operation example of the engine control device 100b shown in FIG. 18.

Next, a third embodiment of the present invention will be described with reference to FIGS. 18 to 21. FIG. 18 is a block diagram showing a configuration example of the engine control device 100 (referred to as an engine control device 100b) shown in FIG. 1. FIG. 19 is a schematic diagram showing a configuration example of an HC increment estimation map 215 shown in FIG. 18. FIG. 20 is a schematic diagram showing a configuration example of a correction gain map 216 shown in FIG. 18. FIG. 21 is a flowchart showing an operation example of the engine control device 100b shown in FIG. 18.

In the third embodiment, the basic configuration of the engine control system 10 shown in FIG. 1 is the same as in the first embodiment. In the third embodiment, the configuration of the engine control device 100b shown in FIG. 18, which corresponds to the configuration of the engine control device 100 shown in FIG. 2, is partially different from the configuration of the engine control device 100 shown in FIG. 2. Specifically, in the engine control device 100 shown in FIG. 2, the environmental condition determination unit 101 determines the environmental conditions, while in the engine control device 100b shown in FIG. 18, the environmental condition determination unit 101 is omitted. In addition, in the engine control device 100b shown in FIG. 18, an HC deposition amount estimation map 201b stored in the storage unit 108 includes the HC decrease amount estimation map 214, the HC increment estimation map 215, and the correction gain map 216.

The HC decrease amount estimation map 214 is the same as in the first embodiment. As shown in FIG. 19, the HC increment estimation map 215 (first correspondence information) defines an HC increment estimated value [mg/s] using engine water temperature and intake manifold temperature as parameters. In addition, the correction gain map 216 (correction information) defines a gain for correcting the HC increment estimated value defined in the HC increment estimation map 215 using the engine rotation speed as a parameter.

An HC deposition amount estimation unit 102b determines the HC increment estimated value using the HC increment estimation map 215 using the engine water temperature and the intake manifold temperature as parameters. Next, the HC deposition amount estimation unit 102b determines a gain value using the correction gain map 216 using the engine rotation speed as a parameter. Then, the HC deposition amount estimation unit 102b calculates the HC increment by multiplying the HC increment estimated value by the determined gain. In addition, the HC increment can be, for example, an increase amount value corresponding to the decrease amount value per calculation cycle calculated from the decrease amount of the HC decrease amount estimation map 214 and the calculation cycle. Similar to the HC deposition amount estimation unit 102, the HC deposition amount estimation unit 102b calculates the HC deposition amount estimated value based on the HC deposition amount estimated value calculated in the previous calculation processing, the HC increase amount, and the HC decrease amount.

For example, when the engine water temperature is 20 [° C.], the intake manifold temperature is −20 [° C.], and the engine rotation speed is 1000 [rpm], HC increases by amount of 24 [mg/s]×1.3=31.2 [mg/s].

Next, with reference to FIG. 21, the flow of processing when the engine control device 100b shown in FIG. 18 estimates the HC deposition amount will be described. The processing shown in FIG. 21 is repeatedly executed at a predetermined calculation cycle. When the processing shown in FIG. 21 is started, the HC deposition amount estimation unit 102b reads the intake manifold temperature, the engine water temperature, the engine rotation speed, and the DOC temperature (step S401). Next, the HC deposition amount estimation unit 102b determines the HC increment using the HC increment estimation map 215 using the engine water temperature and the intake manifold temperature as parameters, determines the gain value using the correction gain map 216 using the engine rotation speed as a parameter, and calculates the corrected HC increment (step S402). Next, the HC deposition amount estimation unit 102*b* estimates the HC decrease amount using the HC decrease amount estimation map 214 (step S403). Next, the HC deposition amount estimation unit 102*b* estimates the HC deposition amount based on the HC deposition amount estimated value calculated in the previous calculation processing, the HC increase amount, and the HC decrease amount (calculates the HC deposition amount estimated value) (step S404), and ends the processing shown in FIG. 21.

According to the present embodiment, the storage unit 108 that stores the first correspondence information representing the correspondence of the first measured value, the second measured value, and the increase amount in hydrocarbons deposited in the exhaust gas purification device 4, and correction information for the first correspondence information based on the third measured value, is provided, and the HC deposition amount estimation unit 102*b* estimates the increase amount by correcting a value estimated based on the first measured value, the second measured value, and the first correspondence information, based on the third measured value and the correction information when estimating the deposition amount. According to this configuration, the HC increase amount can be estimated more easily than in the first embodiment.

As described above, the embodiments of this invention have been described in detail with reference to the drawings, but the specific configuration is not limited to these embodiments, and design changes and the like are included within the scope of this invention. In addition, a part or all of the programs executed by the computer in the above embodiments can be distributed via computer-readable recording media or communication lines.

INDUSTRIAL APPLICABILITY

According to each aspect of the present invention, the hydrocarbon (HC) deposition amount can be estimated appropriately and accurately.

REFERENCE SIGNS LIST

1 Engine (internal combustion engine)
2 Turbocharger
3 Exhaust passage
4 Exhaust gas purification device
5 DPF device
51 DOC
52 DPF
6 SCR device
7 Temperature raising device
8 Monitor
10 Engine control system (exhaust gas purification system)
91 Engine water temperature sensor
92 Intake manifold temperature sensor
93 Engine rotation sensor
94, 95 Temperature sensor
100, 100*a*, 100*b* Engine control device
101, 101*a* Environmental condition determination unit
102, 102*b* HC deposition amount estimation unit
104 Temperature rise control execution unit
108 Storage unit
201, 201*a*, 201*b* HC deposition amount estimation map
211 Environmental condition determination map
212 Normal control HC increase amount estimation map (first correspondence information)
213 Low temperature control HC increase amount estimation map (first correspondence information)
214 HC decrease amount estimation map (second correspondence information)
215 HC increment estimation map (first correspondence information)
216 Correction gain map (correction information)
301 Fuel injection control map

The invention claimed is:

1. A hydrocarbon deposition amount estimation device comprising:
a hydrocarbon deposition amount estimation computer unit that estimates a deposition amount of hydrocarbons deposited in an exhaust gas purification device of an internal combustion engine equipped with an oxidation catalyst based on at least a first measured value corresponding to an intake air temperature of the internal combustion engine, a second measured value corresponding to a temperature of a cooling liquid of the internal combustion engine, and a third measured value corresponding to an exhaust gas flow rate of the internal combustion engine,
a storage computer unit that stores first correspondence information representing a correspondence of the third measured value, a fourth measured value corresponding to a temperature inside the exhaust gas purification device, and an increase amount of hydrocarbons deposited in the exhaust gas purification device, according to environmental conditions of the internal combustion engine, wherein
the hydrocarbon deposition amount estimation computer unit estimates the increase amount based on the environmental conditions of the internal combustion engine determined based on the first measured value and the second measured value, the third measured value, the fourth measured value, and the first correspondence information when estimating the deposition amount, and
the environmental conditions include factors related to at least one of injection timing, rail pressure, pilot injection amount, pilot injection period, and post injection amount, which are related to fuel injection control of the internal combustion engine,
whereby hydrocarbon deposition amount is estimated more accurately based on the first through the fourth measured values than based on an engine rotation speed, an injected fuel mass, an intake air mass, and an ambient temperature as parameters, such that a time until a control that involves fixing an engine rotation speed is started is delayed and as a result, a time during which a normal operating state is continued can be extended.

2. The hydrocarbon deposition amount estimation device according to claim 1, wherein
the storage computer unit further stores second correspondence information representing a correspondence of the third measured value, the fourth measured value, and the decrease amount in hydrocarbons deposited in the exhaust gas purification device, and
the hydrocarbon deposition amount estimation computer unit estimates the decrease amount based on the third measured value, the fourth measured value, and the second correspondence information when estimating the deposition amount.

3. The hydrocarbon deposition amount estimation device according to claim 1, further comprising:
- a storage computer unit that stores first correspondence information representing a correspondence of the first measured value, the second measured value, and the increase amount in hydrocarbons deposited in the exhaust gas purification device, and correction information for the first correspondence information based on the third measured value, wherein
- the hydrocarbon deposition amount estimation computer unit estimates the increase amount by correcting a value estimated based on the first measured value, the second measured value, and the first correspondence information, based on the third measured value and the correction information when estimating the deposition amount.

4. The hydrocarbon deposition amount estimation device according to claim 3, wherein
- the storage computer unit further stores second correspondence information representing a correspondence of the third measured value, the fourth measured value corresponding to the temperature inside the exhaust gas purification device, and the decrease amount in hydrocarbons deposited in the exhaust gas purification device, and
- the hydrocarbon deposition amount estimation computer unit estimates the decrease amount based on the third measured value, the fourth measured value, and the second correspondence information when estimating the deposition amount.

5. A hydrocarbon deposition amount estimation method comprising:
- a step of estimating a deposition amount of hydrocarbons deposited in an exhaust gas purification device of an internal combustion engine equipped with an oxidation catalyst based on at least a first measured value corresponding to an intake air temperature of the internal combustion engine, a second measured value corresponding to a temperature of a cooling liquid of the internal combustion engine, and a third measured value corresponding to an exhaust gas flow rate of the internal combustion engine, and
- a step of storing first correspondence information representing a correspondence of the third measured value, a fourth measured value corresponding to a temperature inside the exhaust gas purification device, and an increase amount of hydrocarbons deposited in the exhaust gas purification device, according to environmental conditions of the internal combustion engine, wherein
- in the step of estimating the increase amount based on the environmental conditions of the internal combustion engine determined based on the first measured value and the second measured value, the third measured value, the fourth measured value, and the first correspondence information when estimating the deposition amount, and
- the environmental conditions include factors related to at least one of injection timing, rail pressure, pilot injection amount, pilot injection period, and post injection amount, which are related to fuel injection control of the internal combustion engine,
- whereby hydrocarbon deposition amount is estimated more accurately based on the first through the fourth measured values than based on an engine rotation speed, an injected fuel mass, an intake air mass, and an ambient temperature as parameters, such that a time until a control that involves fixing an engine rotation speed is started is delayed and as a result, a time during which a normal operating state is continued can be extended.

6. A control device comprising:
the hydrocarbon deposition amount estimation device according to claim 1; and
a temperature rise control execution computer unit that executes temperature rise control of exhaust gas of the internal combustion engine.

* * * * *